(12) United States Patent
Murayama et al.

(10) Patent No.: US 7,044,185 B2
(45) Date of Patent: May 16, 2006

(54) PLATE-LIKE BODY MANUFACTURING METHOD AND APPARATUS CONTROLLING ENTRY OF AIR BUBBLES

(75) Inventors: Noboru Murayama, Kanagawa (JP); Hironori Uemoto, Kanagawa (JP); Shinji Aoki, Kanagawa (JP); Ryuichi Furukawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 235 days.

(21) Appl. No.: 10/218,303

(22) Filed: Aug. 15, 2002

(65) Prior Publication Data

US 2003/0042632 A1    Mar. 6, 2003

(30) Foreign Application Priority Data

| Aug. 31, 2001 | (JP) | ............................. 2001-264726 |
| Jun. 14, 2002 | (JP) | ............................. 2002-174521 |
| Jul. 5, 2002 | (JP) | ............................. 2002-196766 |

(51) Int. Cl.
  *B29C 65/78* (2006.01)
(52) U.S. Cl. ...................... 156/497; 156/539; 156/556; 156/285; 156/286; 156/295
(58) Field of Classification Search ........ 156/285–286, 156/292, 295, 497, 539, 556; 369/286; 118/63; 427/348; 438/455; G11B 7/24, 7/26
  See application file for complete search history.

(56) References Cited

U.S. PATENT DOCUMENTS

| 5,993,592 | A * | 11/1999 | Perego ........................ 156/292 |
| 6,221,454 | B1 * | 4/2001 | Saito et al. ................. 428/64.1 |
| 6,228,203 | B1 * | 5/2001 | Kotoyori et al. ............ 156/291 |
| 6,254,716 | B1 * | 7/2001 | Russell et al. .............. 156/286 |
| 6,881,464 | B1 * | 4/2005 | Waldman et al. .......... 428/64.1 |

FOREIGN PATENT DOCUMENTS

| EP | 0 744 739 A1 | 11/1996 |
| JP | 9-198720 | 7/1997 |
| JP | 11-66645 | 3/1999 |
| JP | 2000-290602 | 10/2000 |

* cited by examiner

*Primary Examiner*—Jessica Rossi
(74) *Attorney, Agent, or Firm*—Oblon, Spivak, McClelland, Maier & Neustadt, P.C.

(57) ABSTRACT

A method of manufacturing a plate-like body formed of first and second members stuck together through liquid includes the steps of (a) applying the liquid on a surface of the first member and (b) feeding gas between the first and second members at an instant of initial contact of the liquid with the second member when the second member is superimposed on the first member.

21 Claims, 15 Drawing Sheets

PLATE-LIKE BODY MANUFACTURING METHOD AND APPARATUS CONTROLLING ENTRY OF AIR BUBBLES

BACKGROUND OF THE INVENTION

1. Field of the Invention

The present invention generally relates to methods and apparatuses for manufacturing a plate-like body, and more particularly to a method and apparatus for manufacturing a plate-like body formed of two members stuck together.

2. Description of the Related Art

Recently, with the digitization of information apparatuses and the accompanying rapid development of multimedia apparatuses, there has been a sharp increase in the amount of processed information (data), thus requesting further increases in the capacities of information recording media.

In the case of an optical information recording medium, for instance, the DVD (digital versatile disk) has come to the front as a next-generation optical information recording medium replacing the CD (compact disk), which has been widely used. The DVD, which has the same diameter as the CD, can record approximately seven times as much data as the CD due to technological improvements in shortening the wavelength of a laser serving as the light source of an optical pickup.

While the CD is formed of a single substrate 1.2 mm in thickness, the DVD is formed of two 0.6 mm-thick substrates stuck together, so that information can be recorded on and reproduced from the CD and the DVD in the same apparatus.

Accordingly, in the process of manufacturing an optical information recording medium formed of two substrates stuck together, such as the DVD, a process of sticking the two optical disk substrates together is essential At the time of sticking the two substrates together, it is important that no air bubbles be allowed to enter or remain in an adhesive agent or between the two substrates. This is because it is probable that air bubbles would become like lenses to refract a laser beam emitted from an optical pickup at the time of reading information, thereby preventing the laser beam from being emitted onto a desired position and causing information reading and reproduction failures. Further, in the case of an optical recording medium of a phase-change recording type, air bubbles may expand through laser emission in the laser annealing process (initialization process) performed after the sticking process so as to damage the recording layer of the recording medium, thus generating a serious defect in the quality of the recording medium. That is, the existence of air bubbles is one of the defect factors in the product life and the physical and electrical characteristics of the optical information recording medium.

A variety of technologies or inventions have been so far proposed on methods or apparatuses for controlling the above-described presence of air bubbles.

Japanese Laid-Open Patent Application No. 9-198720, for instance, discloses a method of sticking disks together so that air bubbles entering between the superimposed disks are removed more satisfactorily (hereinafter this method may be referred to as the first prior art). According to the first prior art, superimposed disks are sandwiched between upper and lower press plates fixed to a shaft part in a hermetically sealed space formed in the main body of a pressurizing device by being covered by a-chamber of a rigid body. When the hermetically sealed space is evacuated to vacuum through an evacuation tube, external pressure added to the chamber deforms an O-ring sealing the chamber, so that the superimposed disks are pressurized by the deformation of the O-ring. That is, the air bubbles in an adhesive agent between the superimposed disks are expelled to the outside by the above-described evacuation.

Japanese Laid-Open Patent Application No. 11-66645, for instance, discloses a technology employing evacuation of a local part of two substrates stuck together through an adhesive agent (hereinafter this technology may be referred to as the second prior art). According to the second prior art, the adhesive agent is provided in a circular ring form on the surface of the lower one of the two substrates, and with the upper substrate being held by a section in the vicinity of its periphery, the two substrates are brought closer to each other. Then, before the upper substrate comes into contact with the adhesive agent provided in the circular ring form on the surface of the lower substrate, gas is evacuated from the internal space surrounded by the surface of the upper substrate, the surface of the lower substrate, and the adhesive agent so that pressure inside the internal space is lower than atmospheric pressure in the external space. In this state, the upper substrate is brought into contact with the adhesive agent provided in the circular ring form on the surface of the lower substrate, thereby reducing generation of air bubbles.

Further, Japanese Laid-Open Patent Application No. 2000-290602 discloses a technology of reducing generation of air bubbles by forming an electric field between two substrates and causing an adhesive agent to have a reduced contact area by tapering off the top parts of the liquid film spots of the adhesive agent by using the attraction of the electric field (hereinafter this technology may be referred to as the third prior art).

However, in the first prior art, the vacuum chamber has a large volume so as to cover the substrates. Therefore, the pressurizing apparatus is required to have a large-scale configuration so as to increase its production cost accordingly. Further, since this type of vacuum chamber has a large internal volume, it is necessary to increase suction force for evacuation and it takes a long time before desired pressure conditions are achieved by evacuation, thus resulting in poor operation efficiency.

According to the second prior art, it is possible to produce a certain effect by making the pressure inside the internal space surrounded by the surfaces of the upper and lower substrates and the adhesive agent lower than the atmospheric pressure in the external space, that is, by locally creating a vacuum atmosphere. However, at the time of the above-described evacuation, negative pressure is suddenly generated in a part around the center hole of the upper substrate, which part corresponds to the center part of the internal space surrounded by the surfaces of the upper and lower substrates and the adhesive agent, so that the adhesive agent may be sucked in. Such a case may result in insufficient joining in sticking together the two substrates, which is the primary object prior to ensuring removal of air bubbles mixed into the adhesive agent.

Further, according to the third prior art, the adhesive agent is allowed to have a reduced contact area by using the attraction of the electric field, thus producing a significant effect in reducing generation of air bubbles. According to the third prior art, however, it is necessary to take a certain measure against the electric field, thus resulting in an increase in the production cost of the apparatus. Further, normally, static electricity elimination and dustproof air blowing are performed as a measure against adhesion of dust to substrates by static electricity (anti-contamination measure) before the adhesive agent is provided. In the third prior art, however, dust in the sticking apparatus is attracted to the substrates undesirably as a result of charging the substrates. Further, the charged substrates are required to be discharged. This increases the cost of the apparatus and the number of operations in the sticking process, thus decreasing productivity.

SUMMARY OF THE INVENTION

Accordingly, it is a general object of the present invention to provide a method and apparatus for manufacturing a plate-like body in which the above-described disadvantages are eliminated.

A more specific object of the present invention is to provide a method and apparatus for manufacturing, at low cost, a plate-like body formed of two members stuck together between which presence of air bubbles is effectively controlled.

The inventors of the present invention, as a result of repeatedly conducting experiments under various conditions in sticking together two members through a liquid, found out two main factors of the entry of air bubbles into the liquid in sticking together the members. First, when the liquid enters a surface contact state at the time of coming into contact with the members, gas (normally, air) existing in space between the members and the liquid is kept therebetween at the instant of contact to turn into air bubbles (first air bubble generation factor). Second, after the liquid comes into contact with the members, the members are pressed toward each other to cause the liquid to spread in given directions so that adjacent liquid parts are joined to each other. In this process, gas (normally, air) existing in space between the adjacent liquid parts is kept therebetween to turn into air bubbles (second air bubble generation factor).

The present invention is made in view of the above-described findings (first and second air bubble generation factors) obtained by the inventors.

The above objects of the present invention are achieved by A method of manufacturing a plate-like body formed of first and second members stuck together through liquid, the method including the steps of (a) applying the liquid on one of surfaces of the first member and (b) feeding gas between the first and second members at an instant of initial contact of the liquid with the second member when the second member is superimposed on the first member.

According to the above-described method, a given force generated by the gas is applied to the liquid by feeding the gas, so that at the instant of the initial contact of the liquid with the second member, the second member and the liquid come into substantially line or point contact, thereby sufficiently reducing the area of the contact. Accordingly, as is apparent from the above-mentioned first air bubble generation factor, according to the present invention, the entry of air bubbles into the liquid for sticking the first and second members together is effectively controlled in the sticking process. Consequently, air bubbles are effectively prevented from remaining between the two members forming the plate-like body obtained as a final product. Further, in this case, special facilities including the above-described vacuum chamber are unnecessary, so that cost can be reduced. At least one of the first and second members may include a curved surface. Accordingly, the plate-like body according to the present invention may include a curved surface.

The above objects of the present invention are also achieved by an apparatus for manufacturing a plate-like body formed of first and second members stuck together through liquid, the apparatus including a placement table having a substantially horizontal surface on which the first member is placed with one of surfaces thereof facing upward, the one of the surfaces having the liquid applied thereon in advance, a holding unit holding the second member above the placement table, a state changing part moving the second member held by the holding unit above and opposite the first member placed on the placement table so that the second member is superimposed on the first member through the liquid, and a gas feeding part feeding gas between the first and second members.

According to the above-described apparatus, a given force generated by the gas is applied to the liquid by feeding the gas, so that at the instant of the initial contact of the liquid with the second member, the second member and the liquid come into substantially line or point contact, thereby sufficiently reducing the area of the contact. Accordingly, as is apparent from the above-mentioned first air bubble generation factor, according to the present invention, the entry of air bubbles into the liquid for sticking the first and second members together is effectively controlled in the sticking process. Consequently, air bubbles are effectively prevented from remaining between the two members forming the plate-like body obtained as a final product. Further, in this case, special facilities including the above-described vacuum chamber are unnecessary, so that cost can be reduced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 1:
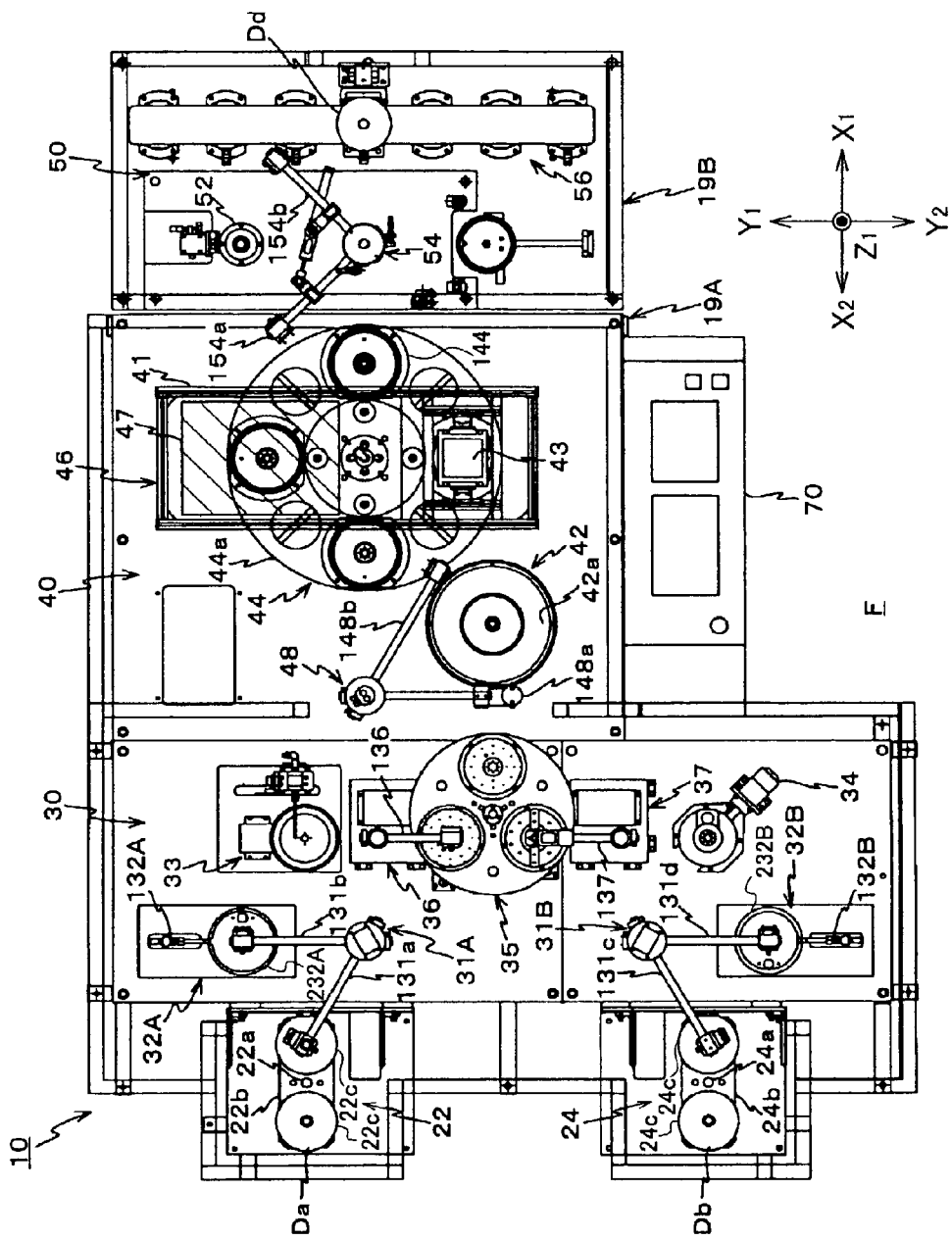
FIG. 1 is a plan view of an optical disk manufacturing apparatus according to an embodiment of the present invention, showing the outline of the configuration thereof.

FIG. 1 is a plan view of an optical disk manufacturing apparatus 10 as an apparatus for manufacturing a recording medium according to the embodiment of the present invention, showing the outline of the configuration of the optical disk manufacturing apparatus 10. The optical disk manufacturing apparatus 10 manufactures an optical information recording medium such as a DVD by sticking together two disk substrates of a disk shape each having a center hole (opening) in its center part.

As shown in FIG. 1, the optical disk manufacturing apparatus 10 includes a first stacker part 22, a second stacker part 24, a sticking part 30, an adhesive agent hardening part 40, a testing and discharging part 50, and a control unit 70 controlling the operations of these parts 22, 24, 30, 40, and 50. The first stacker part 22 stores a plurality of recording substrates Da as first substrates in a layered state. The second stacker part 24 stores a plurality of cover substrates Db as second substrates in a layered state. The sticking part 30 extracts the recording and cover substrates Da and Db from the first and second stacker parts 22 and 24, respectively, and sticks each recording substrate Da to the corresponding cover substrate Db by using an adhesive agent. The adhesive agent hardening part 50 adjusts the thickness of the adhesive agent between each pair of recording and cover substrates Da and Db stuck together in the sticking part 30 and thereafter hardens the adhesive agent. The testing and discharging part 50 tests and discharges to the outside of the optical disk manufacturing apparatus 10 each pair of stuck recording and cover substrates Da and Db processed through the adhesive agent hardening part 40.

The first and second stacker parts 22 and 24, the sticking part 30, and the adhesive agent hardening part 40 are mounted on a first base 19A provided on a floor surface F, and the testing and discharging part 50 is mounted on a second base 19B provided on the floor surface F to be adjacent with its $X_2$ side to the first base 19A.

The first stacker part 22 is provided near the upper left corner (the $Y_1$ end part of the $X_2$ end part) of the first base 19A in FIG. 1. The first stacker part 22 includes a center shaft 22a, a substrate holder 22b that is rotatable about the center shaft 22a extending along the Z-axis, and a pair of stackers 22c provided in symmetrical positions with respect to the center shaft 22a on the substrate holder 22b. Each of the paired stackers 22c has a shaft that is inserted into the center hole of each recording substrate Da, and supports a plurality of layered recording substrates Da with the shaft being inserted into the center holes thereof. Each of the stackers 22c includes an elevation mechanism (not shown in the drawing) that lifts up the recording substrates Da one after another from below.

Figure 2A:
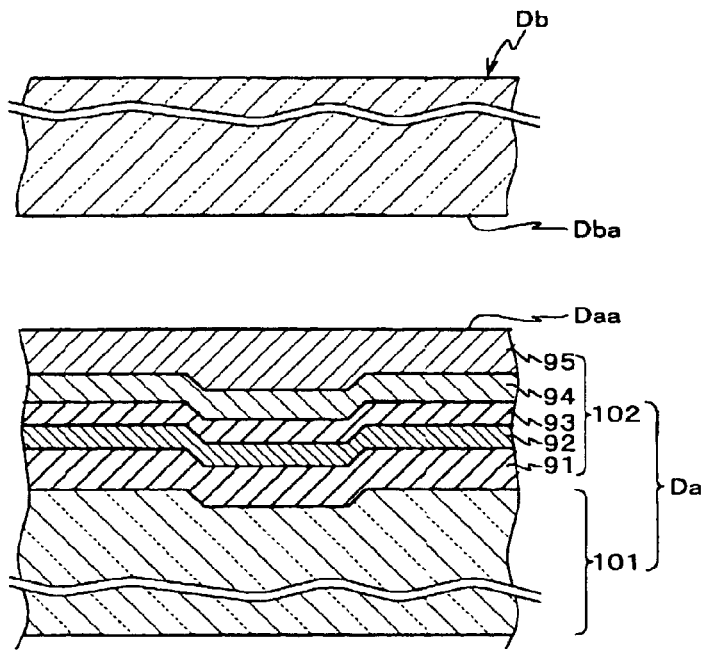
FIG. 2A is a diagram sectionally showing the configurations of a recording substrate and a cover substrate according to the present invention.

Each of the recording substrates Da stored in the first stacker part 22 is a substantially circular substrate having a center hole Dac (see FIG. 4) formed in its center position. Each recording substrate Da has a sectional structure as shown in FIG. 2A. That is, each recording substrate Da includes a 0.6 mm polycarbonate substrate 101 and an intermediate layer 102 formed thereon. The intermediate layer 102 is formed of a first dielectric film (under layer) 91, a phase-change recording film 92 as a recording layer, a second dielectric film (top layer) 93, a reflective film 94, and a UV curable resin protective film 95 that are layered successively on the polycarbonate substrate 101. The entire intermediate layer 102 is approximately one μm in thickness. The recording substrates Da are supported by the paired stackers 22c forming the first stacker part 22 of FIG. 1 with the upper surfaces (bonding surfaces) Daa of their respective intermediate layers 102 facing upward.

Referring back to FIG. 1, the second stacker part 24 has the same configuration as the first stacker part 22, and includes a center shaft 24a, a substrate holder 24b, and a pair of stackers 24c. Each of the cover substrates Db stored in the second stacker part 24 has the same circular shape as the 0.6 mm polycarbonate substrate 101 and has a center hole Dbc (see FIG. 4) formed in its center position. As shown in FIG. 2A, each cover substrate Db is formed of a plate-like polycarbonate member. The cover substrates Db are supported by the paired stackers 24c forming the second stacker part 24 of FIG. 1 with their respective lower surfaces (bonding surfaces) Dba facing upward.

The recording and cover substrates Da and Db are transported into the optical disk manufacturing apparatus 10 manually by operators or mechanically through an automatic transportation apparatus (not shown in the drawing).

Referring back to FIG. 1, the sticking part 30 includes a pair of first transfer units 31A and 31B, a pair of cleaner parts 32A and 32B, an adhesive agent applicator 33, a reverser 34, a turntable unit 35 for sticking operation, and a pair of second transfer units 36 and 37.

The first transfer units 31A and 31B are provided in close proximity to the first and second stacker parts 22 and 24, respectively, on their $X_1$ sides. The cleaner parts 32A and 32B are provided on the $Y_1$ side of the first transfer unit 31A and on the $Y_2$ side of the second transfer unit 31B, respectively. The adhesive agent applicator 33 is provided on the $X_1$ side of the cleaner part 32A. The reverser 34 is provided on the $X_1$ side of the cleaner part 32B. The turntable unit 35 is provided at a position from which the adhesive agent applicator 33 and the reverser 34 are equally spaced with respect to the Y-axis. The second transfer units 36 and 37 are provided in close proximity to the turntable unit 35 on its $Y_1$ and $Y_2$ sides, respectively.

The first transfer unit 31A has two arms 131a and 131b that are spread at a given angle from each other. The arm 131a transfers the recording substrates Da from the first stacker part 22 to the cleaner part 32A, and the other arm 131b transfers the recording substrates Da from the cleaner part 32A to the adhesive agent applicator 33.

The other first transfer unit 31B has two arms 131c and 131d that are spread at a given angle from each other. The arm 131c transfers the cover substrates Db from the second stacker part 24 to the cleaner part 32B, and the other arm 131d transfers the cover substrates Db from the cleaner part 32B to the reverser 34.

The cleaner part 32A includes a substrate placement part 232A on which each recording substrate Da is placed and a blow mechanism 132A that blows gas onto the bonding surface Daa of each recording substrate Da placed on the substrate placement part 232A in order to remove dust on the bonding surface Daa. The cleaner part 32B includes a substrate placement part 232B on which each cover substrate Db is placed and a blow mechanism 132B that blows gas onto the bonding surface Dba of each cover substrate Db placed on the substrate placement part 232B in order to remove dust on the bonding surface Dba. The blow mechanisms 132A and 132B may be replaced by a static elimination mechanism that removes dust by using static electricity. In such a case, it is preferred to provide a discharger for discharging and neutralizing charged substrates in order to prevent electric charges from causing the adhesive agent to come into contact with the substrates after the removal of dust.

Figure 3:
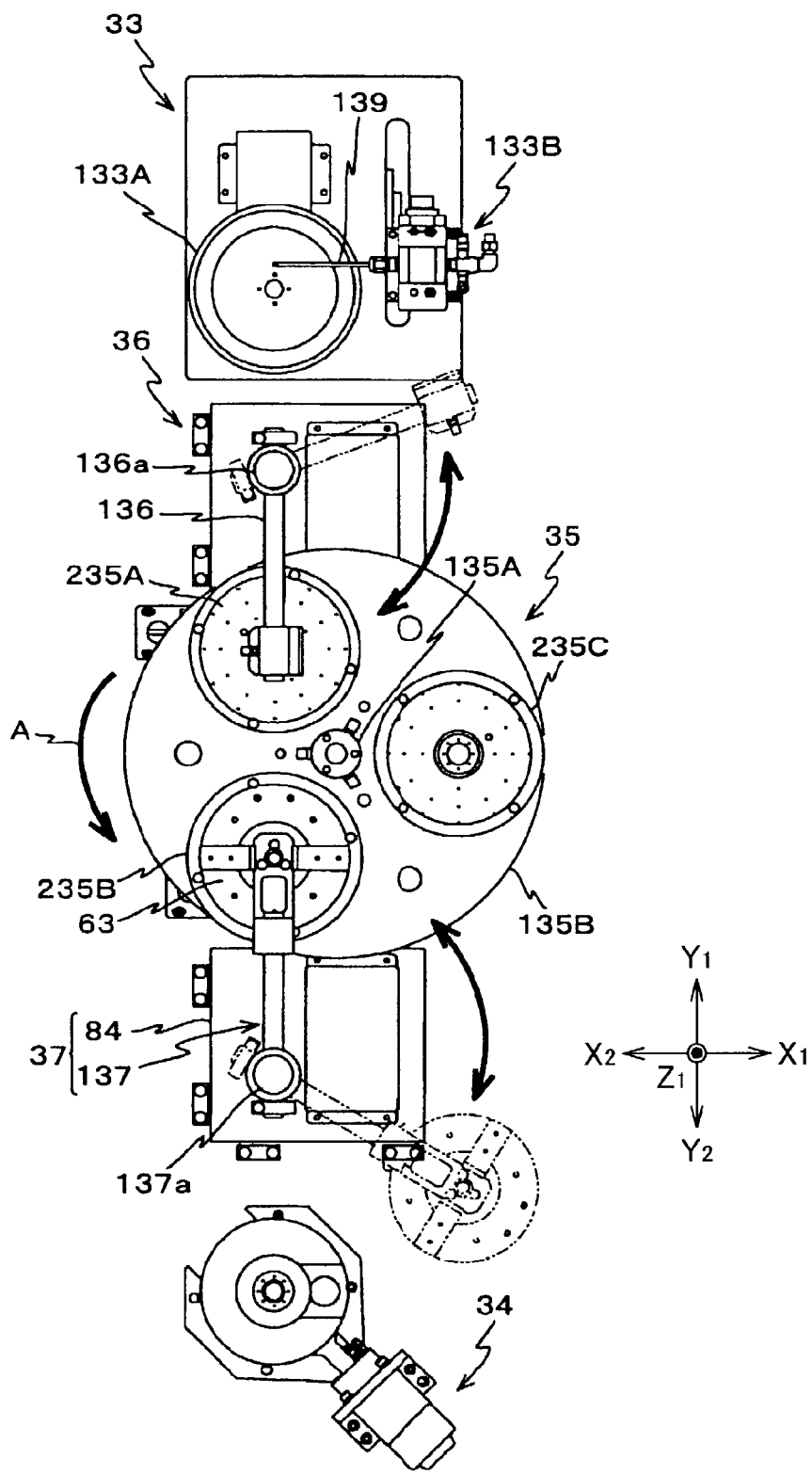
FIG. 3 is an enlarged plan view of a turntable unit and its periphery of the optical disk manufacturing apparatus of FIG. 1.

FIG. 3 is an enlarged view of the turntable unit 35 of FIG. 1 and its periphery. As shown in FIG. 3, the adhesive agent applicator 33 includes a substrate placement table 133A and an adhesive agent application mechanism 133B. An adhesive agent ejection nozzle 139 is provided to the adhesive agent application mechanism 133B. The adhesive agent application mechanism 133B includes a drive mechanism (not shown in the drawing) that drives the adhesive agent ejection nozzle 139 along the X-axis and Y-axis. The adhesive agent ejection nozzle 139 is driven by the drive mechanism so that its distal end can draw a circle with respect to a horizontal surface. Therefore, by thus driving the adhesive agent ejection nozzle 139 with the adhesive agent being ejected therefrom onto the bonding surface Daa of each recording substrate Da placed on the substrate placement table 133A, the adhesive agent can be applied circularly on the bonding surface Daa An ultraviolet (UV) curable adhesive agent, which has the property of hardening on application of ultraviolet rays, is used as the adhesive agent.

As previously described, the first transfer unit 31A has the two arms 131a and 131b that are spread at the given angle and turnable about the Z-axis. The center of the $X_1$-side stacker 22c of the first stacker part 22, the center of the substrate placement part 232A of the cleaner part 32A, and the center of the substrate placement table 133A of the adhesive agent applicator 33 are provided to have the same distance from the center of rotation ($Y_2$ ends) of the arms 131a and 131b. Further, letting the center of rotation of the arms 131a and 131b be the center of a circle with the above distance being its radius, a central angle formed between the radius running through the center of the $X_1$-side stacker 22c and the radius running through the center of the substrate placement part 232A is equal to a central angle formed between the radius running through the center of the substrate placement part 232A and the radius running through the center of the substrate placement table 133A.

Thereby, the first transfer unit 31A can simultaneously transfer one recording substrate Da from the $X_1$-side stacker 22c of the first stacker part 22 to the substrate placement part 232A of the cleaner part 32A by the arm 131a and another recording substrate Da from the substrate placement part 232A of the cleaner part 32A to the substrate placement table 133A of the adhesive agent applicator 33 by the other arm 131b.

The reverser 34 has the function of holding each cover substrate Db and turning each cover substrate Db upside down. That is, the bonding surface Dba of each cover substrate Db is set to face downward by the reverser 34.

As previously described, the first transfer unit 31B also has the two arms 131c and 131d that are spread at the given angle and turnable about the Z-axis. The center of the $X_1$-side stacker 24c of the second stacker part 24, the center of the substrate placement part 232B of the cleaner part 32B, and the center of a substrate held by the reverser 34 are provided to have the same distance from the center of rotation ($Y_1$ ends) of the arms 131c and 131d. Further, letting the center of rotation of the arms 131c and 131d be the center of a circle with the above distance being its radius, the two sectors formed by the radii running through the above-described three centers have the same central angle.

Thereby, the first transfer unit 31B can simultaneously transfer one cover substrate Db from the $X_1$-side stacker 24c of the second stacker part 24 to the substrate placement part 232B of the cleaner part 32B by the arm 131c and another cover substrate Db from the substrate placement part 232B of the cleaner part 32B to the reverser 34 by the other arm 131d.

As shown in FIG. 3, the turntable unit 35 includes a rotational shaft 135A, a turntable 135B rotated about the rotational shaft 135A by a rotation mechanism (not shown in the drawing), and three placement tables 235A through 235C provided on the upper surface of the turntable 135B around the rotational shaft 135A at central angles of approximately 120° from one another.

The turntable 135B of the turntable unit 35 stops its rotation every 120°. Therefore, when the turntable 135B is rotated counterclockwise (in the direction indicated by the arrow A in FIG. 3) by 120° from the state of FIG. 3 by the rotation mechanism, the placement table 235A is positioned where the placement table 235B is shown positioned in FIG. 3, the placement table 235B is positioned where the placement table 235C is shown positioned in FIG. 3; and the placement table 235C is positioned where the placement table 235A is shown positioned in FIG. 3.

A description will now be given, with reference to FIG. 4, of the structure of the placement table 235B. Each of the placement tables 235A and 235C has the same structure as the placement table 235B.

Figure 4:
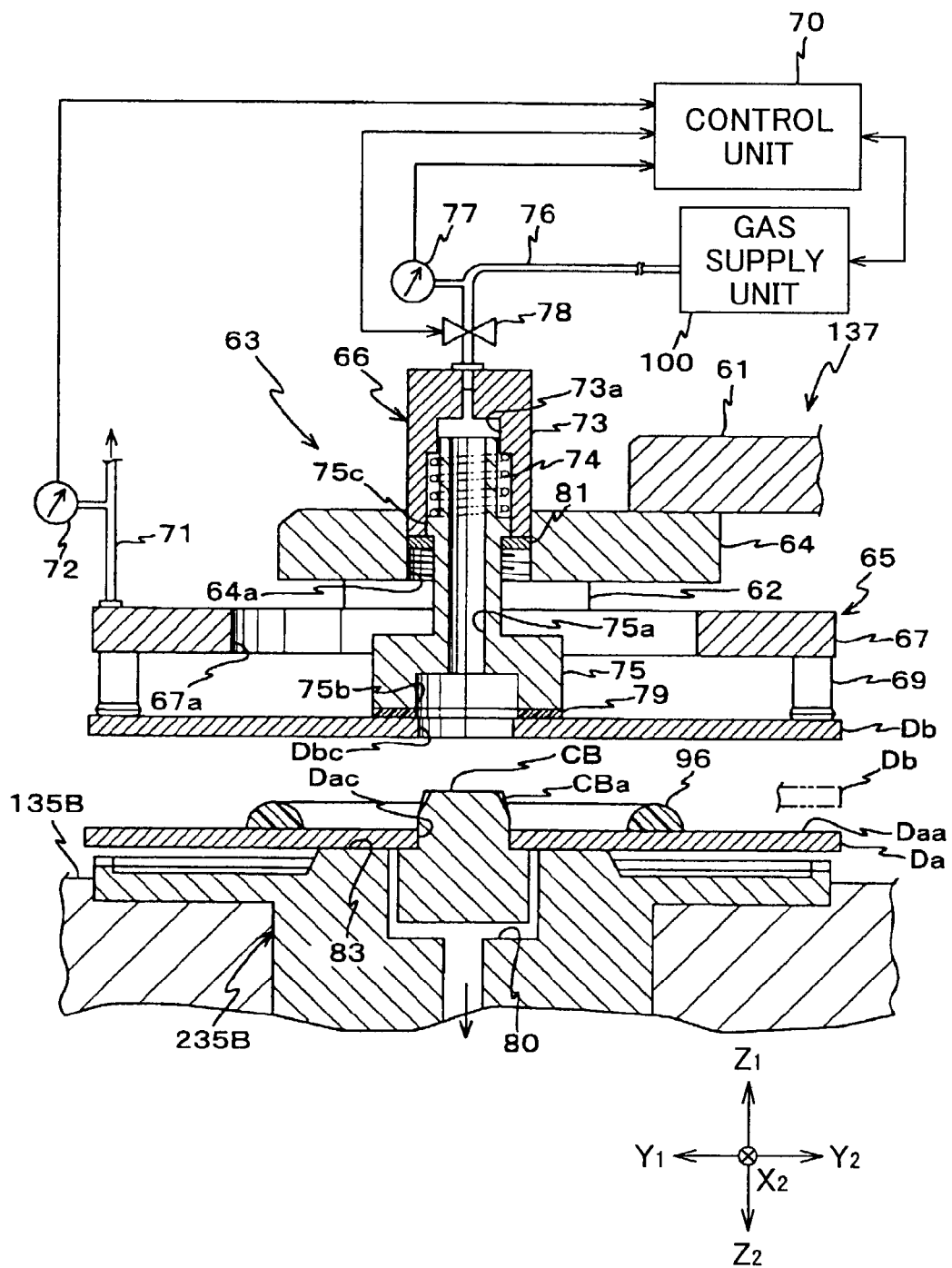
FIG. 4 is a sectional view of a placement table of the turntable unit of FIG. 3 and a distal end part of an arm of a second transfer unit of the optical disk manufacturing apparatus of FIG. 1, the distal end part being positioned substantially right above the placement table.

FIG. 4 is a sectional view of the placement table 235B of the turntable unit 35 and the distal end part of an arm 137 of the second transfer unit 37, the distal end part being positioned substantially right above the placement table 235B. In FIG. 4, the recording substrate Da is placed on a substantially horizontal placement surface 83 formed on the upper surface of the placement table 235B with the bonding surface (adhesive agent application surface) Daa on which an adhesive agent 96 is applied facing upward.

As can be seen from FIGS. 3 and 4, the placement table 235B has a circular shape in its top plan view, and a longitudinal cross section of a substantially T-letter shape.

Further, the placement table 235B, for the most part, is implanted in the turntable 135B. A projection part (hereinafter referred to as a center boss) CB is formed as a positioning part in the center part of the upper surface of the placement table 235B. The center boss CB has substantially the same diameter as the center hole of each of the recording and cover substrates Da and DB. A plurality of cutouts CBa are formed on the upper end of the center boss CB. The center boss CB has the role of positioning the recording and cover substrates Da and Db when the recording and cover substrates Da and Db are superimposed. The cutouts CBa are provided to form a gas channel, and in this embodiment, are shaped so that passing gas may not cause turbulence. A description will be given later of the role of the channel formed by the cutouts.

Further, a vacuum exhaust channel 80 is formed around the center boss CB of the placement table 235B. The recording substrate Da is held to the placement table 235B by a vacuum suction force generated by a vacuum pump (not shown in the drawings) connected to the vacuum exhaust channel 80.

Referring back to FIG. 3, the second transfer unit 36 includes an arm 136 that transfers the recording substrate Da on which the adhesive agent 96 is applied in the adhesive agent applicator 33 onto one of the placement tables 235A through 235C at a given position on the turntable 135B, that is, specifically, the one positioned between the $Y_1$ direction and the $X_2$ direction with respect to the rotational shaft 135A (in the case of FIG. 3, the placement table 235A). The arm 136 is 360° rotatable about a rotational shaft 136a extending along the Z-axis.

Figure 2B:
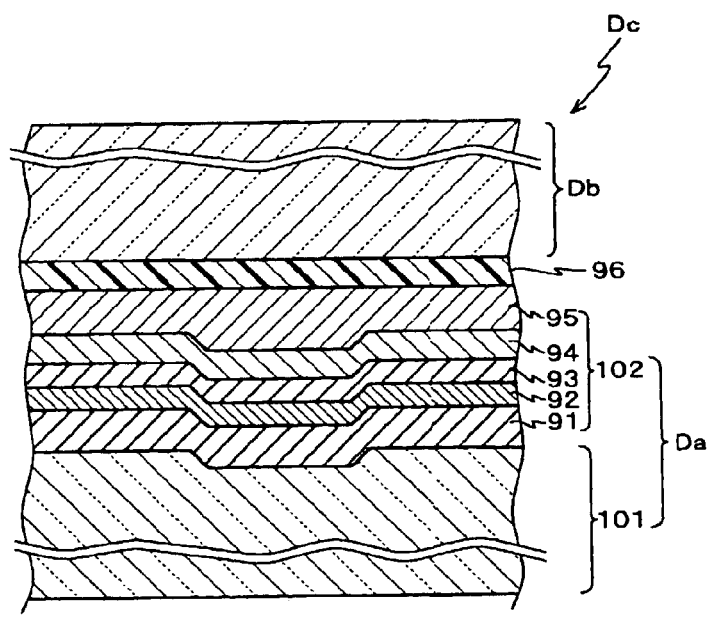
FIG. 2B is a diagram sectionally showing the configuration of a layered substrate according to the present invention.

The second transfer unit 37 includes the arm 137 and a vertical and turning movement mechanism 84 that turns the arm 137 (back and forth) within the range of at least 180° about a rotational shaft 137a thereof and drives the arm 137 vertically along the Z-axis. The arm 137 receives the reversed cover substrate Db from the reverser 34. Next, the arm 137 superimposes the cover substrate Db on the recording substrate Da placed, with the adhesive agent 96 applied thereon, on a given one of the placement tables 235A through 235C, that is, the one positioned next to the second transfer unit 37 in the $Y_1$ direction from the rotational shaft 137a (in the case of FIG. 3, the placement table 235B). Then, the arm 137 sticks the recording and cover substrates Da and Db together, thereby forming a layered substrate Dc as shown in FIG. 2B.

A description will now be given, with reference to FIG. 4, of the structure of the arm 137 of the second transfer unit 37 as a base for describing in detail the substrates sticking operation performed by the second transfer unit 37.

As shown in FIG. 4, the arm 137 includes an arm main body 61 and a cover substrate holding part 63 fixed, as a holding unit, to the lower surface of one end of the arm main body 61 opposite to the rotational shaft 137a.

The cover substrate holding part 63 includes a support member 64, a pair of connecting members 62 (only one on the $X_1$ side is shown in FIG. 4), a suction head 65, and a gas feeder unit 66. The support member 64 is fixed to the lower surface of the arm main body 61. A screw hole 64a is formed in the support member 64 in a position close to its center so as to extend vertically along the Z-axis. The suction head 65 is supported in a pendent state to the lower surface of the support member 64 through the connecting members 62 each extending along the X-axis. The gas feeder unit 66 includes a male screw part corresponding to the screw hole 64a of the support member 64. The gas feeder unit 66 is supported to the support member 64 with the male screw part being engaged with the screw hole 64a.

The suction head 65 includes a support member 67 and a plurality of (for instance, six) suction pads 69. The support member 67, in its top plan view, is formed of an annular plate member having a circular opening 67a formed in its center part. The suction pads 69 are fixed in a pendent state to the lower surface of the support member 67 at positions close to its periphery at given intervals. A vent channel (not shown in the drawing) is formed inside the support member 67 and the suction pads 69. One end of a first vacuum pipe 71 is connected to the support member 67 from its upper surface side so as to communicate with the vent channel. The other end of the first vacuum pipe 71 is connected to a vacuum pump (not shown in the drawing). A vacuum sensor 72, formed of a pressure sensor, is provided in the middle of the vacuum pipe 71. In this case, the output of the vacuum sensor 72 is transmitted to the control unit 70, which controls the vacuum pump based on the measurement value of the vacuum sensor 72 so that the vacuum suction force of the suction pads 69 is set to an appropriate value just sufficient to hold the cover substrate Db against the suction pads 69. The vacuum pump may be the same as or different from the vacuum pump connected to the above-described vacuum exhaust channel 80.

In this embodiment, the suction pads 69 are formed of an elastic material such as rubber considering the effects of flaws on the cover substrate Db. If it is unnecessary to consider the effects of flaws on the cover substrate Db, however, a rigid material may be employed for the suction pads 69. Further, the six suction pads 69 are employed in this embodiment as previously described, but the number of suction pads to be employed is not limited to six. As far as the cover substrate Db is maintained substantially in a horizontal state, any number of suction pads may be employed. In the case of forming the suction pads 69 of a rigid material, suction holes or suction grooves may be formed in the support member 67 along its circumference so as to hold the cover substrate Db by the entire surface through suction. Further, the suction pads 69 may be provided around the circular opening 67a.

The gas feeder unit 66, as shown in FIG. 4, includes a bottomed (one end closed) cylindrical holder 73, a gas ejection member 75, a stopper member 81, and a compression coil spring 74. The bottomed cylindrical holder 73 includes an inner stepped hollow (space) part 73a extending vertically along the Z-axis and has an opening formed on its lower surface. The gas ejection member 75 of a substantial (reversed) T-shape has its upper end part inserted into the hollow part 73a of the holder 73. The stopper member 81 is fixed to the lower end surface of the holder 73 so as to prevent the gas ejection member 75 from falling off downward. The compression coil spring 74 constantly biases the gas ejection member 75 downward.

The above-described male screw part that is screwed into and engaged with the screw hole 64a of the support member 64 is formed on the external surface of the lower half part of the holder 73. By engaging the male screw part with the screw hole 64a, the holder 73 is supported to the support member 64 so as to extend vertically along the Z-axis. A gas channel communicating with the hollow part 73a is formed in the bottom part (shown on the upper side in FIG. 4) of the holder 73. One end of a gas supply pipe 76 is connected from above to the bottom part of the holder 73 so as to communicate with the gas channel. A regulator 77 that maintains the pressure of the internal gas to a given set value and a flow control valve 78 are provided to the gas supply pipe 76 at positions close to the one end thereof. The other end of the gas supply pipe 76 is connected to a gas supply unit 100. In this case, if air, for instance, is employed as the gas to be supplied via the gas supply pipe 76 into the holder 73, an apparatus having a compressor as an air source, for instance, can be employed as the gas supply unit 100.

The regulator 77, the flow control valve 78, and the gas supply unit 100 are connected to the control unit 70. That is, the control unit 70 adjusts gas pressure by controlling the regulator 77, adjusts gas flow by controlling the opening of the flow control valve 78, and adjusts the temperature of the supplied gas by controlling the gas supply unit 70 based on the measurement value of a temperature sensor (not shown in the drawing). The control unit 70 controls the regulator 77 and the flow control valve 78 so that the pressure and the amount of ejection of the gas is optimized based on the viscosity of the adhesive agent 96 and the rate of superimposition of the cover substrate Db. Further, the control unit 70 controls the temperature of the gas to a given target value. This is because it is desirable to maintain the surface temperature of the adhesive agent 96 at a constant value since the viscosity of the adhesive agent 96 varies to affect the optimum amount of ejection of the gas when the surface temperature of the adhesive agent 96 is changed by the ambient gas.

The gas ejection member 75 is shaped to have an external appearance of a stepped cylinder including a smaller diameter part and a larger diameter part. The smaller diameter part extends vertically along the Z-axis and the larger diameter part is formed on the lower end of the smaller diameter part, thereby forming the gas ejection member 75. As previously described, the upper end part of the smaller diameter part of the gas ejection member 75 is inserted into the hollow part 73a of the holder 73, and a flange part 75c is formed protrusively on the smaller diameter part at a position slightly above the center of its length. The stopper member 81 contacts the flange part 75c from its lower side, thereby preventing the gas ejection member 75 from falling off downward.

The compression coil spring 74 is provided inside the holder 73 with one of its end surfaces being pressed onto a step part formed inside the holder 73 and the other being pressed onto the upper surface of the flange part 75c. A pair of semicircular members formed by dividing an annular member substantially into halves, for instance, are employed as the stopper member 81.

In attaching the gas feeder unit 66 to the support member 64, first, the gas ejection member 75 is inserted into the screw hole 64a from its lower side to be lifted upward so that the flange part 75c is positioned higher than the upper surface of the support member 64 by a given distance. In this state, the compression coil spring 74 is attached around the gas ejection member 75 from its upper side, and thereafter, the gas ejection member 75 with the compression coil spring 74 is covered, from its upper side, with the holder 73. Then, the stopper member 81 formed of the paired semicircular members is fixed to the lower end surface of the holder 73 with screws. Thereby, the gas feeder unit 66 is assembled. Next, the male screw part formed on the external surface of the holder 73 is screwed into the screw hole 64a from its upper side to be engaged therewith. Thus, the attachment of the gas feeder unit 66 to the support member 64 is completed.

A circular hole 75b of a given depth is formed on the lower end surface of the larger diameter part of the gas ejection member 75. A gas channel 75a is formed vertically along the Z-axis inside the smaller diameter part so as to communicate with the inside of the hole 75b. In this case, the gas supplied into the hollow part 73a via the gas supply pipe 76 is ejected outside from the lower end of the hole 75b via the gas channel 75a. That is, the hole 75b forms the ejection opening of the gas. Therefore, hereinafter, the hole 75b may be referred to as an ejection opening 75b.

An elastic member 79 formed of rubber in a circular ring is fixed to the periphery of the ejection opening 75b formed on the lower end surface of the gas ejection member.

As can be seen from FIG. 4, the ejection opening 75b has such a diameter and depth (size and shape) that the center boss CB of the placement table 235B can enter the ejection opening 75b when the entire arm 137 is driven downward to a given position (that is, when the cover substrate Db is moved downward to a position indicated by an imaginary line Db' in FIG. 4). Further, the diameter of the ejection opening 75b is set to be slightly larger than that of the center hole Dbc of the cover substrate Db. However, when centering accuracy is required in positioning the arm 137 over the placement table 235B, the diameter of the ejection opening 75b is set to be substantially as large as that of the center hole Dbc of the cover substrate Db.

Figure 5A:
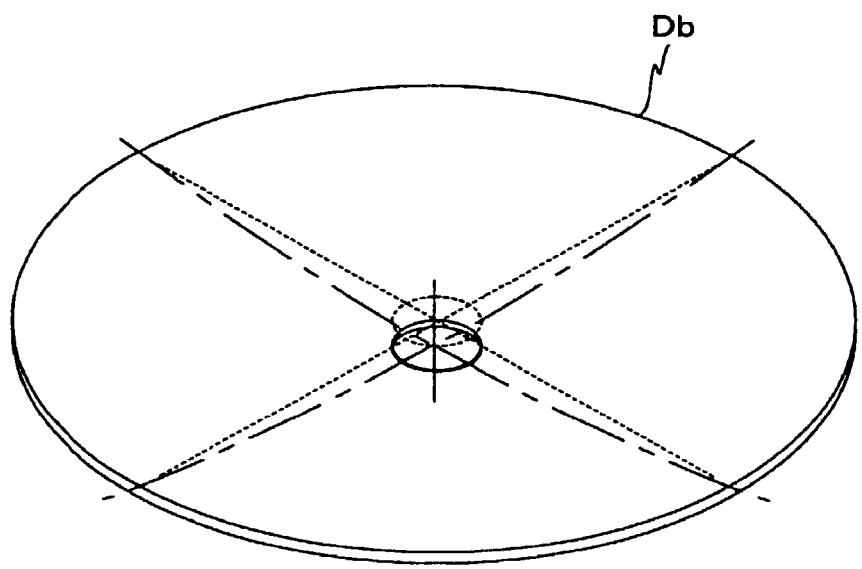
FIG. 5A is a perspective view of the cover substrate, showing the shape thereof, the cover substrate being held by a cover substrate holding part of the arm of FIG. 4 before being stuck with the recording substrate according to the present invention.
Figure 5B:
FIG. 5B is a longitudinal sectional view of the cover substrate of FIG. 5A.

In this embodiment, with the cover substrate holding part 63 holding the cover substrate Db, the gas ejection member 75 constantly presses down on the periphery of the center part of the cover substrate Db by its own weight and the elastic force (biasing force) of the compression coil spring 74. That is, the cover substrate holding part 63 holds the cover substrate Db in a curved state as shown in FIGS. 5A and 5B by having the lower end surface of the gas ejection member 75 positioned lower than the lower end surface of each suction pad 69. FIGS. 5A and 5B are a perspective view and a longitudinal sectional view (side sectional view) of the cover substrate Db held by the cover substrate holding part 63, respectively. In this case, the curvature of the cover substrate Db can be adjusted easily by adjusting the vertical difference between the position of the gas ejection member 75 and the positions of the suction pads 69 by controlling the amount by which the holder 73 is screwed into the support member 64.

As can be seen from FIG. 4, the gas ejection member 75 can be slid upward with respect to the holder 73 by applying force to the gas ejection member 75 from its lower side against the elastic biasing force of the compression coil spring 74. Therefore, even in the case of the vacuum force holding the cover substrate Db turned upside down by the reverser 34 to be flat or curved in the direction reverse to the curving direction of FIG. 5B, for instance, when the gas ejection member 75 is pressed onto the periphery of the center hole Dbc of the cover substrate Db from its upper side, the gas ejection member 75 is slid upward against the elastic biasing force of the compression coil spring 74 by a reactive force to the pressing force. Thereby, the cover substrate Db can be held without excessive force being applied. Further, after the cover substrate Db is held by the cover substrate holding part 63, the gas ejection member 75 returns to the state of FIG. 4 due to the elastic force of the compression coil spring 74. Therefore, the cover substrate Db can be held in the curved state of FIG. 5B as described above.

Referring back to FIG. 1, the adhesive agent hardening part 40 includes a spinner 42, a hardening turntable unit 44, an ultraviolet (UV) irradiation unit 46, and a third transfer unit 48. The spinner 42 is provided on the $X_1$ side of the turntable unit 35. The hardening turntable unit 44 is provided in close proximity to the spinner 42. The UV irradiation unit 46 is provided to cover the hardening turntable unit 44. The third transfer unit 48 transfers the layered substrate Dc (formed by sticking the recording and cover substrates Da and Db together) among the turntable unit 35, the spinner 42, and the hardening turntable unit 44.

The spinner 42 includes a disklike turntable 42a and a rotational drive mechanism (not shown in the drawing). The turntable 42a holds on its upper surface the layered substrate Dc (see FIG. 2B) transferred from the turntable 135B of the turntable unit 35 by the third transfer unit 48 as will be described later. The rotational drive mechanism rotates the turntable 42a at high speed about the center point thereof with the Z-axis being an axis of rotation. The spinner 42 adjusts the thickness of the layer of the adhesive agent 96 of the layered substrate Dc by blowing away extra adhesive agent between the recording and cover substrates Da and Db by using the centrifugal force generated by rotating at high speed the turntable 42a holding the layered substrate Dc.

The hardening turntable unit 44 includes a disklike turntable 44a and a rotational drive mechanism (not shown in the drawing) that supports the turntable 44a at its center from its lower side and rotates the turntable 44a clockwise in FIG. 1. Four substrate placement parts 144 are provided at equal angular intervals (at intervals of central angles of 90°) on the turntable 44a. The turntable 44a of the hardening turntable unit 44 stops its rotation every 90°. Therefore, each of the substrate placement parts 144 is circulated through the twelve o'clock position (a position on the $Y_1$ side of the center of the turntable 44a), the three o'clock position (a position on the $X_1$ side of the center of the turntable 44a), the six o'clock position (a position on the $Y_2$ side of the center of the turntable 44a), the nine o'clock position (a position on the $X_2$ side of the center of the turntable 44a) from one to the next.

The UV irradiation unit 46 includes a lamp housing 41, a UV lamp 47, and a cooler 43. The lamp housing 41 is provided to cover space above the turntable 44a. The UV lamp 47 is provided above one of the substrate placement parts 144 which one is located at the twelve o'clock position on the turntable 44a, and irradiates the layered substrate Dc placed on the one of the substrate placement parts 144 with ultraviolet rays. The cooler 43 is provided close to one of the substrate placement parts 144 which one is located at the six o'clock position on the turntable 44a, and cools the one of the substrate placement parts 144, whose temperature is raised by the UV irradiation by the UV lamp 47. The external surface of the lamp housing 41 is provided with a shield cover so as to prevent the leakage of the ultraviolet rays.

The third transfer unit 48 includes two arms 148a and 148b that are spread at a given angle and turnable about the Z-axis. The center of one of the substrate placement parts 144 which one is at the nine o'clock position on the turntable 44a, the rotational center of the spinner 42, and the center of one of the placement tables 235A through 235C which one is at the three o'clock position on the turntable 135B of the turntable unit 35 (or on the $X_1$ side of the rotational center of the turntable 135B) are provided to have the same distance from the center of rotation of the arms 148a and 148b. Further, letting the center of rotation of the arms 148a and 148b be the center of a circle with the above distance being its radius, a central angle formed between the radius passing through the center of the one of the substrate placement parts 144 which one is at the nine o'clock position on the turntable 44a and the radius passing through the rotational center of the spinner 42 is equal to a central angle formed between the radius passing through the rotational center of the spinner 42 and the radius passing through the center of one of the placement tables 235A through 235C.

Therefore, the third transfer unit 48 can transfer one layered substrate Dc from the one of the placement tables 235A through 235C which one is at the three o'clock position on the turntable 135B to the spinner 42 by the arm 148a and at the same time transfer another layered substrate Dc from the spinner 42 to the one of the substrate placement parts 144 which one is at the nine o'clock position on the turntable 44a.

The testing and discharging part 50 includes a testing unit 52, a substrate discharging unit 56, and a fourth transfer unit 54. The testing unit 52 conducts a tilt inspection and checks the existence of air bubbles with respect to the layered substrate Dc whose adhesive agent 96 is hardened by the adhesive agent hardening part 40. Hereinafter, the layered substrate Dc in this state is referred to as a "bonded substrate Dd" for convenience of description. The substrate discharging unit 56 discharges the bonded substrate Dd tested in the testing unit 52 to the outside of the optical disk manufacturing apparatus 10. The fourth transfer unit 54 transfers the bonded substrate Dd among the hardening turntable unit 44, the testing unit 52, and the substrate discharging unit 56.

The fourth transfer unit 54 includes two arms 154a and 154b. The arm 154a transfers the bonded substrate Dd from the turntable 44a of the hardening turntable unit 44 to the testing unit 52. The other arm 154b transfers the bonded substrate Dd from the testing unit 52 to the substrate discharging unit 56.

The testing unit 52 includes a measurement unit that holds the bonded substrate Dd transferred by the arm 154a and performs optical measurement such as disk tilt measurement by emitting a detection light onto the bonded substrate Dd from its lower side. The testing unit 52 further includes an air bubble defect testing unit employing image processing, which unit includes a CCD camera acquiring the image of the bonded substrate Dd and an image processing unit that performs given processing on the image signal of the CCD camera and detects the presence or absence of air bubbles based on the processing results.

The substrate discharging unit 56 determines, based on the results of the tests by the testing unit 52, whether the bonded substrate Dd is acceptable or defective, and discharges the bonded substrate Dd only when the bonded substrate Dd is determined to be acceptable.

The control unit 70, which is formed of a workstation (or a microcomputer), controls the above-described individual components of the optical disk manufacturing apparatus 10 and also the entire optical disk manufacturing apparatus 10.

A brief description will be given, basically with reference to FIG. 1, of the flow of an operation performed by the optical disk manufacturing apparatus 10 having the above-described configuration. The operation of each component is controlled by the control unit 70, but a description thereof is omitted for the purpose of simplicity.

(a) First, the arm 131a of the first transfer unit 31A receives the recording substrate Da from the first stacker part 22, and transfers the received recording substrate Da onto the substrate placement part 232A of the cleaner part 32A. The arm 131a returns to a wait state (the state of FIG. 1) to receive the next recording substrate Da. In the cleaner part 32A, the blow mechanism 132A performs blowing for dustproofing on the bonding surface Daa of the recording substrate Da placed on the substrate placement part 232A. After the dustproof blowing is completed, the arm 131b of the first transfer unit 31A transfers the recording substrate Da from the cleaner part 32A onto the substrate placement table 133A of the adhesive agent applicator 33, and the adhesive agent application mechanism 133B applies the adhesive agent 96 (see FIG. 4) in a circular ring formed on the bonding surface Daa of the recording substrate Da as previously described. At the same time that the arm 131b transfers the recording substrate Da from the cleaner part 32A to the adhesive agent applicator 33, the arm 131a transfers the next recording substrate Da from the first stacker part 22 to the cleaner part 32A. Next, the second transfer unit 36 transfers the recording substrate Da with the adhesive agent 96 being applied thereon from the adhesive agent applicator 33 to one of the placement tables 235A through 235C provided on the turntable 135B of the turntable unit 35 which one is at the position of the placement table 235A shown in FIG. 3. In this case, the one of the placement tables 235A through 235C is the placement table 235B.

(b) In parallel with the operation of (a), the arm 131c of the other first transfer unit 31B receives the cover substrate Db from the second stacker part 24, and transfers the received cover substrate Db onto the substrate placement part 232B of the cleaner part 32B. The arm 131c returns to a wait state (the state of FIG. 1) to receive the next cover substrate Db. In the cleaner part 32B, the blow mechanism 132B performs blowing for dustproofing on the bonding surface Dba of the cover substrate Db placed on the substrate placement part 232B. After the dustproofing blowing is completed, the arm 131d of the first transfer unit 31B transfers the cover substrate Db from the cleaner part 32B to the reverser 34, which turns the transferred cover substrate Db upside down. At the same time the arm 131d transfers the cover substrate Db from the cleaner part 32B to the reverser 34, the arm 131c transfers the next cover substrate Db from the second stacker part 24 onto the substrate placement table 232B of the cleaner part 32B. Next, the arm 137 of the second transfer unit 37 transfers the reversed cover substrate Db from the reverser 34 to a given wait position above the turntable 135B of the turntable unit 35. Holding the cover substrate Db, the arm 137 waits at this position substantially right above the position of the placement table 235B of FIG. 3.

(c) When the recording substrate Da is placed on the placement table 235B of the turntable 135B in the operation of (a), the turntable 135B is rotated counterclockwise 120° so that the placement table 235B having the recording substrate Da placed thereon is positioned as shown in FIG. 3.

(d) Next, the arm 137 of the second transfer unit 37 holding the cover substrate Db is moved downward by the vertical and turning movement mechanism 84 so that the recording and cover substrates Da and Db are stuck together into the layered substrate Dc (see FIG. 2B). A detailed description will be given, with reference to FIGS. 4, 6A through 6D, 7A and 7B, of the operation of sticking the recording and cover substrates Da and Db together.

The change of operating states of the cover substrate holding part 63 and the change of states of the adhesive agent 96 over time are shown in FIGS. 6A through 6D.

Figure 6A:
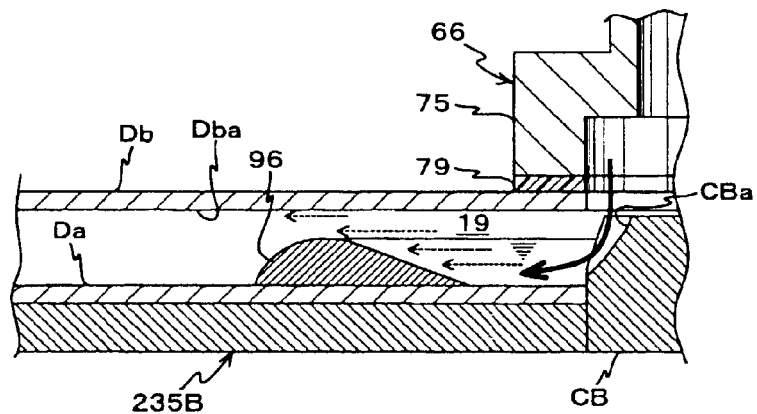
FIGS. 6A through 6D are diagrams showing the change of operating states of the cover substrate holding part of FIG. 5A and the change of states of an adhesive agent over time according to the present invention.

First, the arm 137 holding the cover substrate Db at the position of FIG. 4 (an initial position) is moved downward at a given rate by the vertical and turning movement mechanism 84. FIG. 6A shows a state after a given period of time has passed since the start of the downward movement of the arm 137. Before the start of the downward movement of the arm 137, with the target pressure of the regulator 77 being set to a given target value and the flow control valve 78 being opened at a proper opening, the gas feeder unit 66 has started to eject (spray) gas such as air in the downward direction through the center hole Dbc of the cover substrate Db.

When the cover substrate Db approaches the recording substrate Da with the ejection (spraying) of air so as to enter the state of FIG. 6A, pressure in a space (internal space) 19 surrounded by the adhesive agent 96 applied in the circular ring formed on the bonding surface Daa of the recording substrate Da and the recording and cover substrates Da and Db has started to increase. When the pressure of the air is higher than the viscosity of the adhesive agent 96, the adhesive agent 96 starts to move outward in the radial direction. As the air travels toward the periphery of each of the recording and cover substrates Da and Db, however, the air decreases its flowing speed and starts to be affected by loss of pressure caused by friction with the bonding surface Dba of the cover substrate Db. At the stage of FIG. 6A, a relatively large space is formed between the adhesive agent 96 and the cover substrate Db. Therefore, the air flows toward the periphery of each of the recording and cover substrates Da and Db, so that the increase in the pressure inside the internal space 19 is limited. Accordingly, as shown in FIG. 6A, the adhesive agent 96 is not biased so much toward the periphery of each of the recording and cover substrates Da and Db.

Figure 6B:
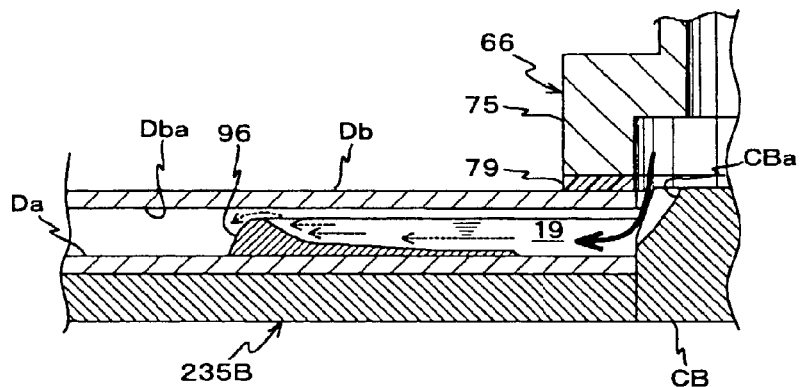

FIG. 6B is a diagram showing a state where the cover substrate Db is moved further downward from the state of FIG. 6A to be closer to the recording substrate Da. In this case, the space between the cover substrate Db and the adhesive agent 96 is narrowed. Therefore, the amount of air flowing from the internal space 19 to the periphery of each of the recording and cover substrates Da and Db decreases, thus further increasing the pressure inside the internal space 19. In this state, the adhesive agent 96 starts to gather to form a mound (swell) where the viscosity of the adhesive agent 96 is balanced with the pressure of the air.

The distance between the adhesive agent 96 and the cover substrate Db is the smallest at the top of the mound of the adhesive agent 96. Therefore, the flowing speed of the air is suddenly increased when the air passes through the gap between the cover substrate Db and the mound of the adhesive agent 96, while the pressure of the air is decreased, thus generating negative pressure with respect to the adhesive agent 96. Thereby, the amount by which the adhesive agent is raised, that is, the height of the mound of the adhesive agent 96, is further increased. That is, the high-speed airflow causes the negative pressure to be generated in the gap with the same principle as in an ejector. The generation of the negative pressure further increases the amount or the height of the mound of the adhesive agent 96.

At this point, the cover substrate Db is moved downward to the release point indicated by the two-dot chain line Db' in FIG. 4. At this release point, vacuum suction by the suction pads 69 of the arm 137 holding the cover substrate Db is switched off so that the cover substrate Db is released. After the release of the cover substrate Db, the vertical and turning movement mechanism 84 moves the arm 137 upward to the above-described initial position.

Figure 6C:
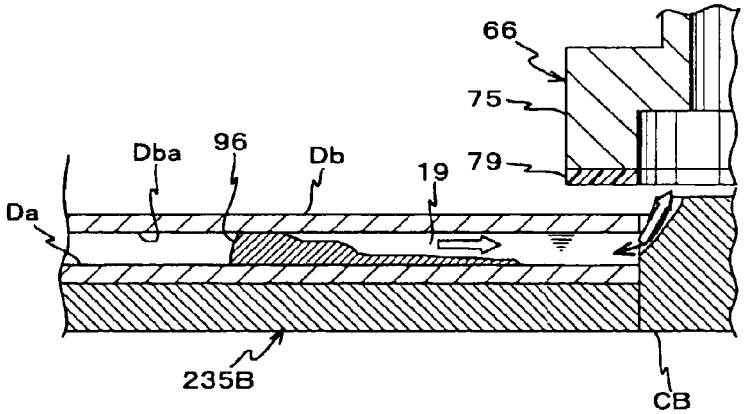
Figure 7A:
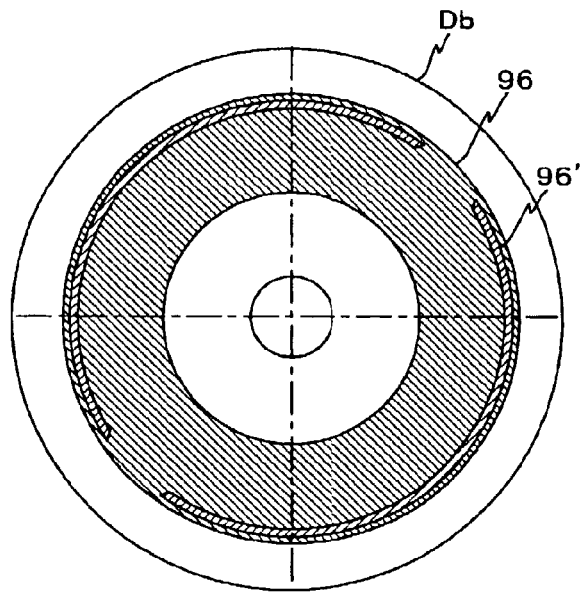
FIG. 7A is a plan view of the cover substrate, showing the state of the adhesive agent of FIG. 6C applied on the cover substrate.

FIG. 6C is a diagram showing a state immediately after the release of the cover substrate Db. FIG. 7A is a diagram showing the state of the adhesive agent 96 of FIG. 6C in a plan view. In FIG. 7A, the hatched area made by rightward oblique parallel lines indicates the adhesive agent 96, and the hatched area made by leftward oblique parallel lines around the periphery of the adhesive agent 96 indicates a contact area 96' of the cover substrate Db and the adhesive agent 96.

In this case, since the top of the adhesive agent 96 is partially raised sharply as previously described (see FIG. 6B), the cover substrate Db and the adhesive agent 96 come into substantial line contact with each other as shown in FIG. 7A. In this case, since the upper surface of the mound of the adhesive agent 96 includes some irregularities, the contact area 96' is not always formed in a continuous circle without any gaps.

As a result of repeatedly conducting experiments, the inventors found out that by releasing an upper substrate (corresponding to the cover substrate Db) and reducing or stopping feeding of gas immediately after a mound as shown in FIG. 6B was formed, the area of an adhesive agent which area first touched the upper substrate came into line contact with the upper substrate.

In this embodiment, since the gas feeder unit 66 (specifically, the gas ejection opening 75b of the gas ejection member 75) is attached to the arm 137, the gas ejection opening 75b is detached from the cover substrate Db at the same time that the arm 137 is moved upward after releasing the cover substrate Db, so that the amount of gas (air) fed into the internal space 19 is reduced as the arm 137 is moved upward. That is, in this embodiment, the above-described line contact of the adhesive agent 96 with the cover substrate Db is realized without stopping or reducing the ejection of the gas. Thus, according to this embodiment, the line contact is realized, with no complicated control operation, by continuing constant ejection of the gas at the same flow rate from the start of the ejection of the gas. The rates at which the arm 137 is moved upward and downward are controlled by the control unit 70.

Figure 7B:
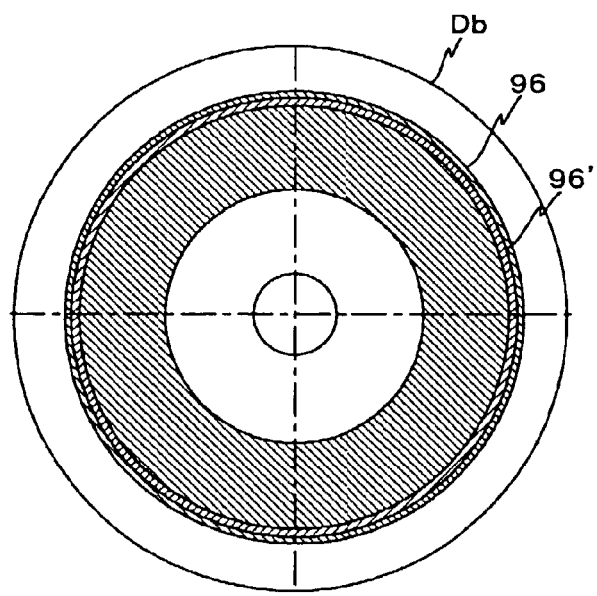
FIG. 7B is a plan view of the cover substrate, showing the state of the adhesive agent applied on the cover substrate immediately after the state of FIG. 7A.

Thereafter, receiving the weight of the cover substrate Db, the contact area 96' spreads in the circumferential and radial directions. In this case, the contact area 96' spreads faster circumferentially than radially. Therefore, the contact area 96' (line contact area) is formed into a continuous circle as shown in FIG. 7B.

Figure 6D:
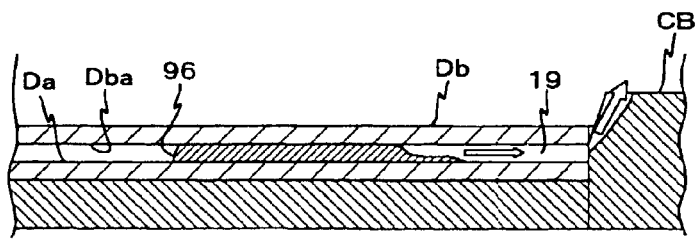

On the other hand, after the cover substrate Db is released, the flow of gas fed into the internal space 19 is gradually reduced as previously described. Therefore, the adhesive agent 96 spreads so that the contact area 96' extends radially toward the center of each of the recording and cover substrates Da and Db, receiving the weight of the cover substrate Db to discharge gas trapped in the internal space 19 through the cutouts CBa of the center boss CB. FIG. 6D shows the state at this point.

Thus, sticking of the recording and cover substrates Da and Db is completed. As described above, in this embodiment, the cover substrate Db and the adhesive agent 96 applied on the recording substrate Da first come into line contact with each other. Therefore, there scarcely exists any gas (air) between the cover substrate Db and the adhesive agent 96 at the instant of their contact. Accordingly, there is scarcely any possibility of the generation of air bubbles due to the above-described first air bubble generation factor.

Further, after the cover substrate Db and the adhesive agent 96 applied on the recording substrate Da contact each other, the adhesive agent 96 spreads faster circumferentially than radially. Therefore, a ring of a very fine line is formed of the adhesive agent 96 in a short period of time after the contact of the adhesive agent 96 with the cover substrate Db. In the formation process of the ring, there scarcely exists any gas (air) between any adjacent two arc parts of the adhesive agent 96. Accordingly, there is scarcely any possibility of the generation of air bubbles due to the above-described second air bubble generation factor.

Therefore, in this embodiment, there is scarcely any possibility of the generation of air bubbles in the process of sticking the recording and cover substrates Da and Db together.

(e) When the sticking operation is completed as described above, the turntable 135B of the turntable unit 35 is rotated 120° so that the layered substrate Dc is moved to the position at which the placement table 235C is located as shown in FIG. 3 and waits at this position.

(f) Then, the arm 148a of the third transfer unit 48 transfers the layered substrate Dc from the placement table 235B onto the turntable 42a of the spinner 42. After this transfer, the arm 148a moves away from the spinner 42 and waits in a given position such as the position shown in FIG. 1 to transfer the next layered substrate Dc to the spinner 42.

(g) Next, the turntable 42a holding the layered substrate Dc is rotated at high speed for a given period of time. At this point, the speed and the period of rotation of the turntable 42a are controlled based on the viscosity of the adhesive agent 96 and atmospheric temperature so that the thickness of the layer of the adhesive agent 96 in the layered substrate Dc is set to a given value. After the rotation of the turntable 42a is completed, the arm 148b of the third transfer unit 48 transfers the layered substrate Dc from the turntable 42a to one of the substrate placement parts 144 which one is at the nine o'clock position on the turntable 44a of the hardening turntable unit 44. After the rotation of the turntable 42a is completed, the placement table 235A that holds the next layered substrate Dc waits at the three o'clock position on the turntable 135B of the turntable unit 35. In parallel with the transfer of the layered substrate Dc from the turntable 42a to the turntable 44a by the arm 148b, the arm 148a transfers the next layered substrate Dc from the placement table 235A on the turntable 135B to the turntable 42a. After these transfers, the arms 148a and 148b move away from the spinner 42 and the hardening turntable unit 44, respectively, and wait to transfer their respective next layered substrates Dc.

(h) Next, the turntable 44a is rotated clockwise 90° so that the UV lamp 47 of the UV irradiation unit 46 irradiates with ultraviolet rays the layered substrate Dc placed on one of the substrate placement parts 144 which one is located at the twelve o'clock position on the turntable 44a. Thereby, the adhesive agent 96 inside the layered substrate Dc is hardened so that the layered substrate Dc is formed into the bonded substrate Dd. After the UV irradiation is completed, the turntable 44a is further rotated 90°. Before this rotation, the next layered substrate Dc is transferred onto one of the substrate placement parts 144 which one is located at the nine o'clock position on the turntable 44a. Then, the turntable 44a is rotated 90° as described above, and the one of the substrate placement parts 144 which one has the bonded substrate Dd placed thereon is moved to the three o'clock position on the turntable 44a to be in a wait state. During this wait state, the UV irradiation unit 46 performs UV irradiation on the next layered substrate Dc placed on the one of the substrate placement parts 144 which one is now located at the twelve o'clock position on the turntable 44a.

(i) Next, the arm 154a of the fourth transfer unit 54 transfers the bonded substrate Dd to the testing unit 52, and the testing unit 52 performs the above-described disk tilt measurement and air bubble defect testing on the bonded substrate Dd. Then, the bonded substrate Dd that has been subjected to the disk tilt measurement and the air bubble defect testing is transferred from the testing unit 52 to the substrate discharging unit 56 by the arm 154b. The next bonded substrate Dd can be transferred from the turntable 44a to the testing unit 52 in parallel with the transfer of the bonded substrate Dd to the substrate discharging unit 56.

(j) Next, the substrate discharging unit 56 determines, based on the results of the disk tilt measurement and the air bubble defect testing, whether the bonded substrate Dd is acceptable or defective. The substrate discharging unit 56 discharges the bonded substrate Dd when the bonded substrate Dd is determined to be acceptable, or collects the bonded substrate Dd when the bonded substrate Dd is determined to be defective.

Thus, the optical disk manufacturing apparatus 10 repeatedly performs the above-described series of operations of the cleaning process (discharging blow process), the liquid (adhesive agent) application process, the substrates sticking process, the spinner rotation process, the adhesive agent hardening process, the testing process, and the discharging process. After being determined to be acceptable as a result of the above-described tests and discharged from the substrate discharging unit 56, the bonded substrate Dd is initialized as required and shipped as a DVD, which is a final product.

As is apparent from the above description, in this embodiment, the arm 137 having the cover substrate holding part 63 provided on the distal end thereof, the vertical and turning movement mechanism 84 vertically moving and turning the arm 137, and the control unit 70 form a state changing part. The gas feeder unit 66, the gas supply pipe 76, and the gas supply unit 100 form a gas feeding part. Further, the regulator 77, the flow control valve 78, the gas supply unit 100, and the control unit 70 form a control part controlling the pressure, flow, and temperature of the gas. Furthermore, the gas feeder unit 66 also forms a pressing part. The control unit 70 realizes a rate control part.

As described above in detail, according to the optical disk manufacturing apparatus 10 of this embodiment and the method of manufacturing a plate-like body performed in the optical disk manufacturing apparatus 10, in the liquid application process, the adhesive agent application mechanism 133B of the adhesive agent applicator 33 applies the adhesive agent in a circular ring formed on the bonding surface Daa of the recording substrate Da. Then, in the sticking process, the recording substrate Da is placed horizontally on one of the placement tables 235A through 235C of the turntable unit 35 with the bonding surface Daa on which the adhesive agent 96 is applied facing upward. When the one of the placement tables 235A through 235C is moved to the sticking position, the cover substrate Db is held above the recording substrate Da to oppose the recording substrate Da by the cover substrate holding part 63 provided on the distal end of the arm 137 of the second transfer unit 37. At this point, the recording and cover substrates Da and Db are positioned so as to be superimposed vertically on each other This state may be referred to as a first state.

Next, after the arm 137 is moved downward by a given amount by the vertical and turning movement mechanism 84 of the second transfer unit 37, the cover substrate holding part 63 releases the cover substrate Db so that the recording and cover substrates Da and Db are superimposed through the adhesive agent 96. This state may be referred to as a second state.

At this point in this embodiment, before starting to move the arm 137 downward, the gas feeder unit 66 starts to eject gas (air) through the ejection opening 75b. Thereafter, the ejection of gas is maintained so that the gas is continued to be ejected even after the release of the cover substrate Db. Therefore, when the cover substrate Db starts to approach the recording substrate Da, the gas is fed between the recording and cover substrates Da and Db through the center hold Dbc of the cover substrate Dc. More precisely, the gas is fed into the internal space 19 defined by the recording and cover substrates Da and Db and the adhesive agent 96. The feeding of the gas is continued even at the instant of the contact of the adhesive agent 96 with the cover substrate Db. Due to the feeding of the gas, by applying a given force generated by the gas to the adhesive agent 96, the cover substrate Db and the adhesive agent 96 come into substantial line or point contact with each other at the instant of their contact, so that the area of contact is sufficiently reduced.

After the cover substrate Db contacts the adhesive agent 96 applied on the recording substrate Da, the amount of gas fed into the internal space 19 is reduced so that the adhesive agent 96 is spread by the weight of the cover substrate Db. Since the adhesive agent 96 spreads faster circumferentially than radially, a ring of a very fine line is formed of the adhesive agent 96 in a short period of time after the contact. Therefore, there is scarcely any possibility of the entry of air bubbles into the adhesive agent 96 due to the first and second air bubble generation factors. Accordingly, the entry of air bubbles into the adhesive agent 96 bonding the recording and cover substrates Da and Db is effectively controlled in the sticking process, so that air bubbles are effectively prevented from remaining between the two substrates Da and Db forming the finally obtained DVD (bonded substrate Dd). In this case, special facilities including the vacuum chamber of the first prior art are unnecessary so that cost reduction can be realized.

Further, in this embodiment, the gas is fed via the center hole Dbc of the cover substrate Db into the internal space 19 formed inside the adhesive agent 96 applied in the circular ring form on the bonding surface Daa of the recording substrate Da. Therefore, (at least the upper part of) the adhesive agent 96 provided in the circular ring form can be spread almost evenly in the substantially radial direction by the pressure of the gas fed into the internal space 19. Therefore, the contact area of the cover substrate Db and the adhesive agent 96 can be provided immediately as an annular area of a very narrow line width.

Further, in this embodiment, the gas ejection member 75 forming the gas feeder unit 66 presses the periphery of the center hole Dbc of the cover substrate Db until immediately before the release of the cover substrate Db so that the cover substrate Db is held in the curved state as shown in FIG. 5A. Therefore, the warp and undulation of each cover substrate Db can be corrected, and the recording and cover substrates Da and Db can be stuck together with a given change, that is, a change suitable for the sticking, being constantly provided to the shape of the cover substrate Db.

Further, in this embodiment, the recording and cover substrates Da and Db stuck together through the adhesive agent 96 in the sticking process are rotated on the turntable 42a of the spinner 42 at high speed as one unit in the rotation process. Therefore, extra adhesive agent can be blown away by the centrifugal force generated during the rotation. The thickness of the layer of the adhesive agent 96 in the layered substrate Dc formed by sticking the recording and cover substrates Da and Db together can be adjusted to a desired value by controlling the period and the speed of rotation for the above-described rotation operation together.

Further, in this embodiment, the recording and cover substrates Da and Db stuck together are irradiated with ultraviolet rays so that the adhesive agent 96 is hardened in the UV irradiation process after the rotation process. Therefore, the adhesive agent 96 can be hardened in a short period of time.

Further, in this embodiment, all of the pressure, flow, and temperature of the gas fed into the internal space 19 are controlled by the above-described control part (that is, the regulator 77, the flow control valve 78, the gas supply unit 100, and the control unit 70). Therefore, the viscosity of the adhesive agent 96 can be maintained in a substantially constant state by keeping the surface temperature of the adhesive agent 96 in a constant state. Further, the adhesive agent 96 can be caused to make a constant movement between the recording and cover substrates Da and Db by setting the amount of gas fed into the internal space 19 to a constant value.

Further, according to the optical disk manufacturing apparatus 10 of the present invention and the method of manufacturing a plate-like body performed therein, as previously described, the DVD (bonded substrate Dd), which is a bonded-type optical information recording medium, can be manufactured at low cost with air bubbles being effectively prevented from remaining between the recording and cover substrates Da and Db. Therefore, failures in information reading and reproduction resulting from the existence of air bubbles can be effectively controlled so that a DVD enjoying an excellent product life and good physical and electrical characteristics can be provided. Particularly, in the case of manufacturing an information recording medium of a phase-change type, such as a DVD-RAM, a DVD-RW, or a DVD+RW, it is possible to effectively control the generation of the serious defect in quality of a damaged recording layer due to the bursting of air bubbles caused by laser emission in the laser annealing process (initialization process) performed after the sticking process.

Further, in this embodiment, the above-described air bubble defect testing as well as the disk tilt inspection (measurement) is performed in the testing process performed after the UV irradiation process. Since air bubbles are effectively prevented from remaining between the recording and cover substrates Da and Db forming the DVD (bonded substrate) as previously described, the percentage of products determined to be defective as a result of the air bubble defect testing can be decreased considerably. Therefore, productivity can be increased by an increase in the percentage of acceptable products (product yield).

In the above-described embodiment, the gas feeder unit 66 starts to feed gas (air) through the ejection opening 75b before the start of the downward movement of the arm 137, and thereafter, the ejection of gas is maintained so that the gas is continued to be ejected even after the release of the cover substrate Db. This, however, is not the only configuration. The feeding of gas may be started before the adhesive agent 96 contacts the cover substrate Db, and the feeding of gas may be stopped immediately after the adhesive agent 96 contacts the cover substrate Db after the release thereof. The point is that it is sufficient that the feeding of gas is performed at least for part of the period of the sticking process which part includes the instant of the contact of the adhesive agent 96 with the cover substrate Db.

Further, in the above-described embodiment, the gas feeder unit 66 is vertically movable (in the upward and downward directions), and the rate or speed of movement of the gas feeder unit 66 is optimized by the control unit 70. Therefore, fine control is not required for setting timing for the start and end of the ejection of gas (air).

In the above-described embodiment, the adhesive agent 96 is applied in the circular ring formed on the bonding surface Daa of the recording substrate Da. This, however, is not the only configuration, and the adhesive agent 96 may be applied to form any shape such as a straight line or a curved line. Even in such a case, by feeding gas between the recording and cover substrates Da and Db as in the above-described embodiment, the cover substrate Db and the adhesive agent 96, by applying a given force generated by the gas to the adhesive agent 96, come into substantial line or point contact with each other at the instant of their contact, so that the contact area of the cover substrate Db and the adhesive agent 96 is sufficiently reduced. Accordingly, the entry of air bubbles into the adhesive agent 96 bonding the recording and cover substrates Da and Db due to the first air bubble generation factor can be effectively prevented. As a result, air bubbles are effectively prevented from remaining between the recording and cover substrates Da and Db forming the finally obtained recording medium.

Further, in the liquid application process, the adhesive agent 96 may be applied on the recording substrate Da in a different annular form from the above-described circular ring form, such as an oval ring form.

In the above-described embodiment, the gas is fed into the internal space 19 between the recording and cover substrates Da and Db through the center hole Dbc of the cover substrate Db. This, however, is not the only configuration, and the gas may be fed into the internal space 19 through the center hole Dac of the recording substrate Da.

Further, in the above-described embodiment, the control part controls all of the pressure, flow, and temperature of the gas. This, however, is not the only configuration, and the control part may control any one or two of the pressure, flow, and temperature of the gas.

The present invention is not limited to the above-described configurations of the components of the optical disk manufacturing apparatus 10. The arm 137, for instance, may be replaced by an arm 137' having a structure shown in FIG. 8A.

Figure 8A:
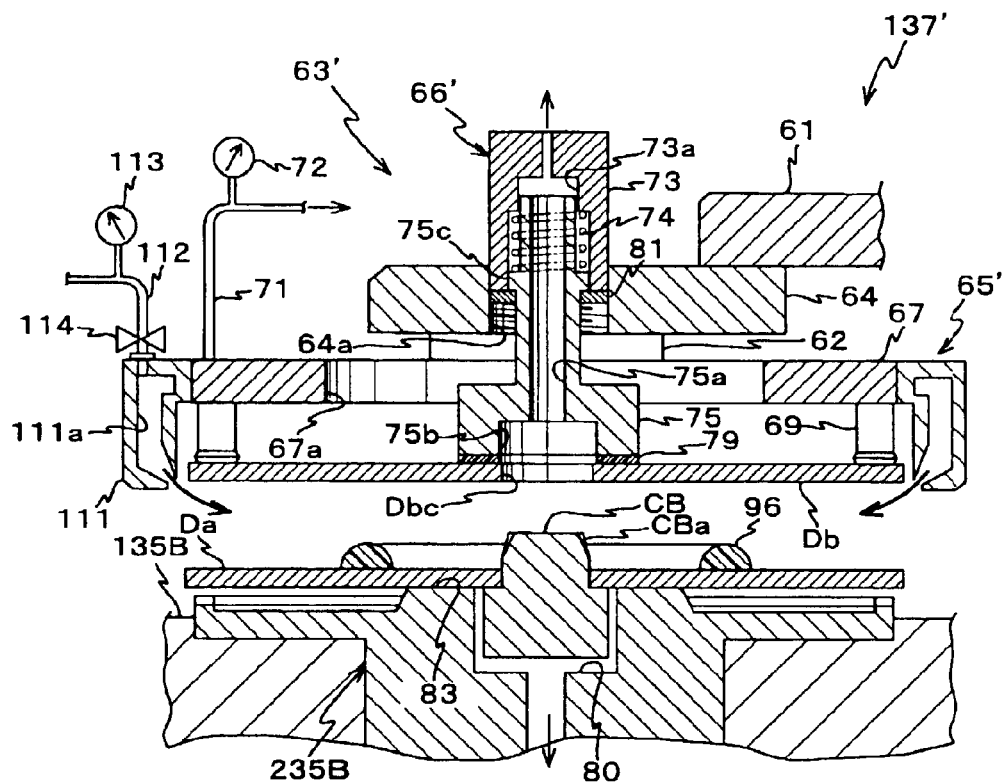
FIG. 8A is a diagram showing a variation of the arm of FIG. 4.

As shown in FIG. 8A, the arm 137' includes the arm main body 61 and a cover substrate holding part 63' provided to the one end of the arm main body 61. The cover substrate holding part 63' basically has the same configuration as the cover substrate holding part 63, but is different therefrom in that an annular gas ejection head 111 having a vent channel 111a formed therein is additionally provided to the periphery of the support member 67 of a circular ring shape and that a gas ejection unit 66' is provided instead of the gas feeder unit 66. In the following description, the same elements as those of the above-described embodiment are referred to by the same numerals.

The vent channel 111a of the gas ejection head 111 is connected to one end of a gas supply pipe 112. A regulator 113 maintaining the pressure of gas to a set value and a flow control valve 114 are provided to the gas supply channel 112 at positions close to the one end of the gas supply pipe 112. The other end of the gas supply pipe 112 is connected to a gas supply unit (not shown in the drawing).

The gas ejection unit 66' is different from the gas feeder unit 66 in that no gas supply pipe is connected to the upper opening of the holder 73. The gas ejection unit 66' ejects upward gas fed from its lower side through the center hole Dbc of the cover substrate Db.

Like the arm 137, the arm 137' holds the cover substrate Db with a vacuum force through the suction pads 69 provided to the support member 67. At the time of sticking the recording and cover substrates Da and Db together, the cover substrate holding part 63' is moved to be positioned above the recording substrate Da placed on, for instance, the placement table 235B of the turntable unit 35. Then, the arm 137' is moved downward until immediately before the cover substrate Db comes into contact with the adhesive agent 96.

During this downward movement, the flow control valve 114 is opened so as to start spraying gas (air) from the gas ejection head 111 to space outside the adhesive agent 96 on the recording substrate Da positioned below the cover substrate Db. Most of the gas sprayed at this point is ejected to the upper surface side of the cover substrate Db through the cutouts CBa of the center boss CB and the center hole Dbc of the cover substrate Db, or is ejected outside through space below the cover substrate Db.

Figure 8B:
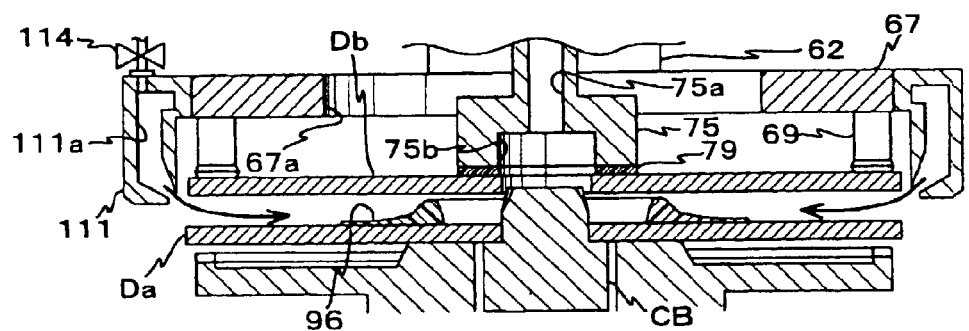
FIG. 8B is a diagram showing a state immediately before the cover substrate is released at the time of sticking the recording and cover substrates by using the arm of FIG. 8A.

Then, as shown in FIG. 8B, at the position where the cover substrate Db and the adhesive agent 96 are located immediately before their contact, the adhesive agent 96 has a rise (mound), as in the above-described embodiment, in the periphery of the center boss CB. At this point, the arm 137' releases the cover substrate Db. Thereby, the adhesive agent 96 and the cover substrate Db come into line contact with each other. After the release of the cover substrate Db, the flow of gas sprayed from the gas ejection head 111 is reduced as the arm 137' moves away from the cover substrate Db. Therefore, after the release of the cover substrate Db, the adhesive agent 96 is pressed from it's upper side by the weight of the cover substrate Db so as to spread radially, ejecting outside the gas remaining between the recording and cover substrates Da and Db.

Thus, in the case of employing the arm 137' having the structure of FIG. 8A, the same effects as in the above-described embodiment can also be produced.

Figure 9:
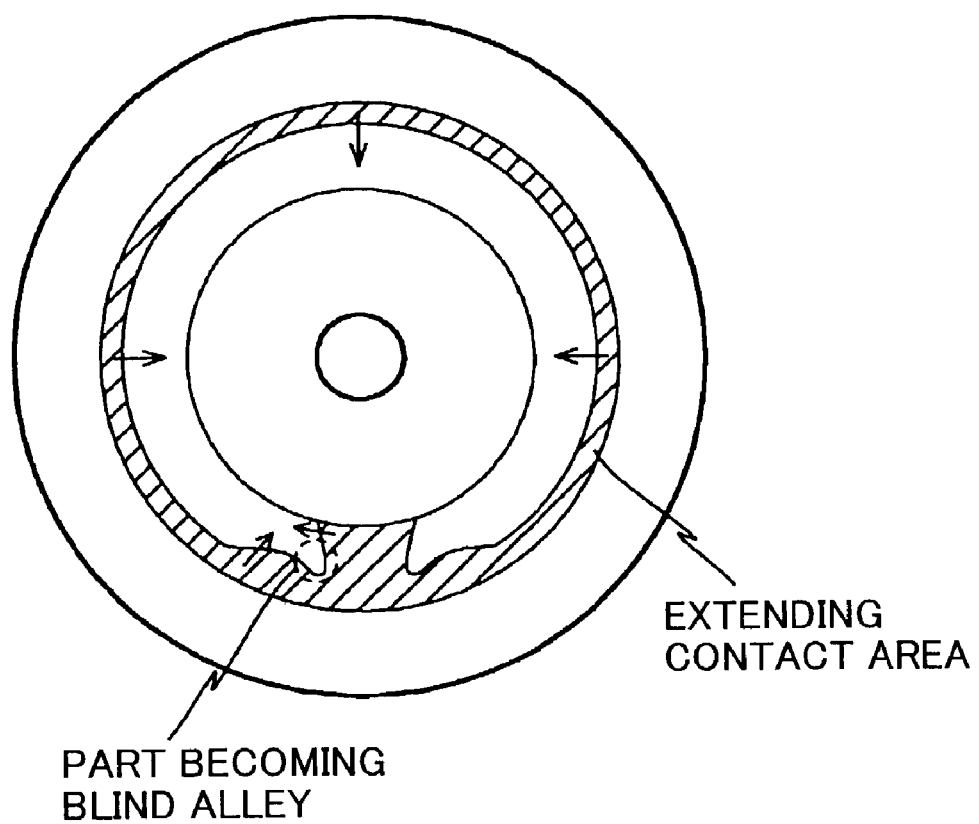
FIG. 9 is a diagram for illustrating an advance adhesion caused by charging.

The inventors, as a result of repeatedly conducting experiments, found out that in some cases, the cover substrate Db and an adhesive agent are prevented from entering a normal line contact state by the locally charged bonding surfaces Daa and Dba of the recording and cover substrates Da an Db. This local charging may be caused by leaving the recording and cover substrates Da and Db unattended for a long period of time before the substrates sticking operation or by inter-substrate contacts during their transportation. Electrodynamically, this is called an EHD (electrohydrodynamical) phenomenon. This phenomenon is caused, when a strong electric field exists on the surface of a liquid, by the action of the Maxwell stress corresponding to the electric field on the liquid. That is, the adhesive agent, which is not supposed to contact the cover substrate Db during its spreading, spreads to come into partial contact with the cover substrate Db under the Maxwell stress at a charged point on the cover substrate Db. The inventors refer to this partial contact as an "advance adhesion". Thereby, when the cover substrate Db is superimposed on the recording substrate Da, the adhesive agent is prevented from spreading radially toward the center of each of the substrates Da and Db at a uniform rate so that a part that is becoming a blind alley may be formed into an air bubble as shown in FIG. 9. The inventors found out that the advance adhesion is prone to occur when the potential difference between the recording and cover substrates Da and Db exceeds 2 kV.

Figure 10:
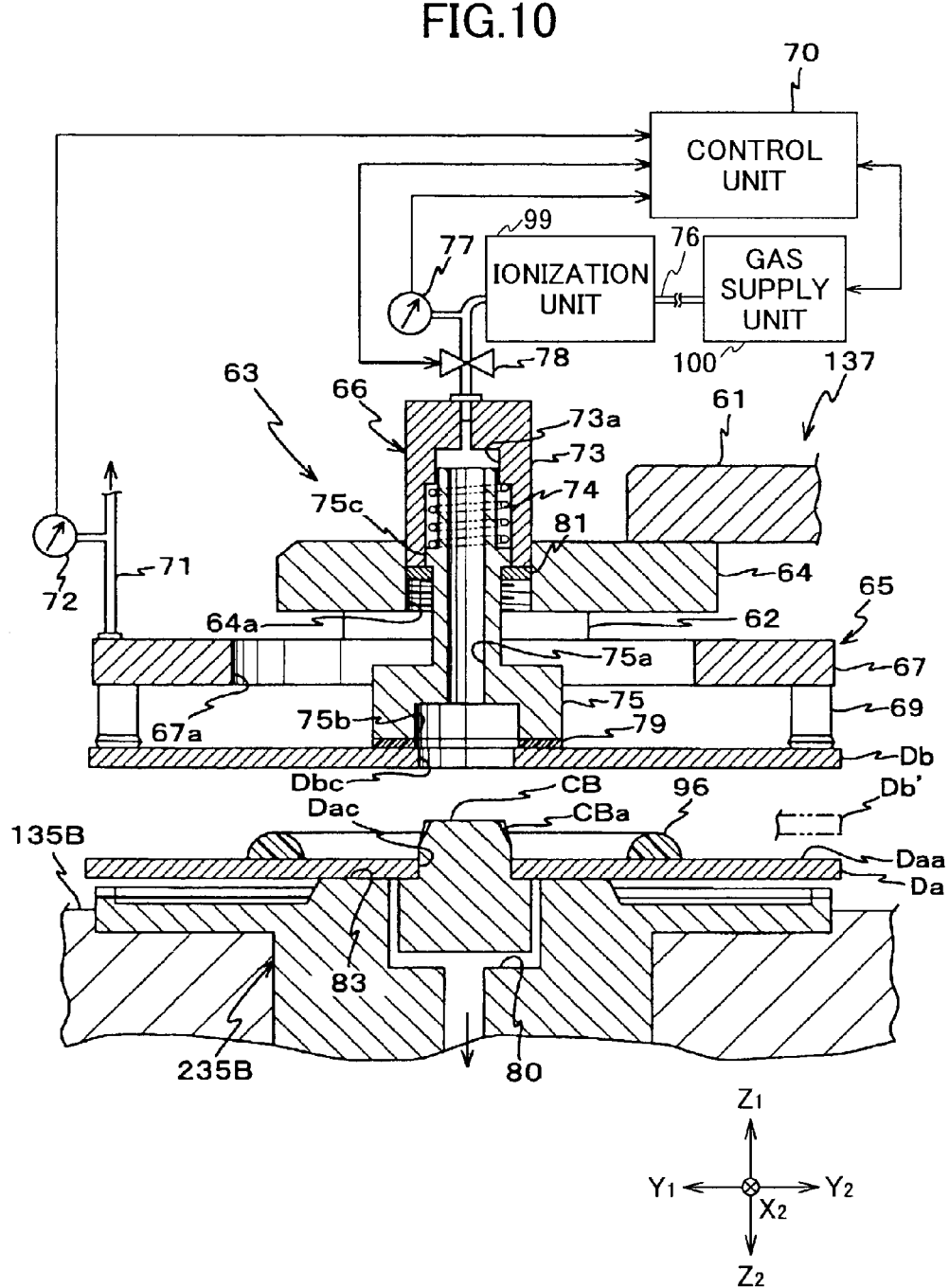
FIG. 10 is a diagram for illustrating a gas feeding part including a discharge-type ionization unit according to the present invention.

Therefore, in order to prevent advance adhesion, a discharge-type ionization unit (generally referred to as an "ionizer") 99 containing a discharge needle for dissociating gas molecules supplied from the gas supply unit 100 into positive and negative ions may be provided between the gas supply unit 100 and the flow control valve 78 as shown in FIG. 10. That is, at the same time that the gas supply unit 100 starts to supply gas, the discharge-type ionization unit 99 is put into operation so as to dissociate the gas molecules flowing through the gas supply pipe 76 into positive and negative ions and supply the ionized gas into space between the recording and cover substrates Da and Db. In this embodiment, for instance, the discharge-type ionization unit 99 raises the voltage of an alternating current of a commercial frequency (50 Hz) to approximately 5 to 8 kV for a gas flow of 8 to 12 [Nl/min], and applies the voltage to the discharge needle. Thereby, when the ionized gas approaches a charged part of any of the recording and cover substrates Da and Db, ions each having a polarity opposite to that of the electric charge of the charged part are attracted to and neutralize the charged part. Thereby, advance adhesion can be prevented.

In this respect, a charge removal process may be performed before the adhesive agent application process in order to electrically neutralize the recording and cover substrates Da and Db. In this case, a charge removal unit is employed.

In the above-described embodiment, it is preferable that the adhesive agent 96 be deaerated in advance under a depressurized condition. Thereby, the amount of air bubbles mixed in the adhesive agent 96 from the beginning is reduced, so that the possibility of air bubbles finally remaining in the adhesive agent 96 can be further reduced.

Further, in the above-described embodiment, with the optical disk manufacturing apparatus 10 being covered entirely with a chamber, an oxygen-free environment may be created inside the chamber. For instance, air inside the chamber may be replaced by nitrogen gas so as to create nitrogen gas space inside the chamber. In this case, since nitrogen gas satisfactorily transmits ultraviolet rays of wavelengths of approximately 150 nm and over, hardly any ultraviolet rays radiated onto the layered substrate Dc are absorbed so that the adhesive agent 96 can be hardened in a shorter period of time in the adhesive agent hardening process, for instance.

In the above-described embodiment, the description is given of the case of manufacturing a single-side single-layer disk in which one of stuck substrates is a recording substrate. However, the present invention is also suitably applicable in the case of manufacturing a double-side single-layer disk in which both of stuck substrates are recording substrates, a single-side dual-layer disk in which one of stuck substrates has dual recording layers, or a double-side dual-layer disk in which each of stuck substrates has dual recording layers.

Further, the optical disk manufacturing apparatus 10 and the method of manufacturing a plate-like body according to the present invention are applicable in the case of manufacturing not only a phase-change-type disk such as a DVD but also a magneto-optical disk as far as the magneto-optical disk is required to be formed as a bonded-type (stuck-type) recording medium. Accordingly, the optical information recording medium of the present invention refers to any of these optical information recording media manufactured by the manufacturing method or apparatus of the present invention. Further, the present invention is applicable to any of a rewritable disk such as a DVD-RAM, a write-once disk such as a DVD-R, and a read-only disk such as a DVD-ROM.

Further, the manufacturing method and apparatus of the present invention are applicable not only in the case of manufacturing a recording medium but also in the case of, for instance, sticking a dustproof plate including a glass plate to the external surface of the substrate of a liquid crystal panel. Accordingly, the plate-like body of the present invention refers to all of the plate-like bodies manufactured by the method and apparatus of the present invention. The plate-like body of the present invention has only a little amount of air bubbles existing between its bonded (stuck) members so that the bonding strength of the plate-like body is increased. Further, if the plate-like body is an optical member, the deterioration of its optical characteristics can be avoided.

Further, in the above-described embodiment, the description is given of the case of sticking plate-like members together. However, the objects of sticking according to the present invention are not limited to plate-like members. The present invention is also applicable in the case of sticking together any members having respective surfaces that can be stuck to each other. For instance, at least one of members to be stuck together may be a hemispherical lens.

Further, in the above-described embodiment, the description is given of the case of sticking two members together by an adhesive agent. However, the two members may be stuck together by a liquid other than the adhesive agent. For instance, the two members may be stuck together by using the surface tension of liquid.

Figure 11:
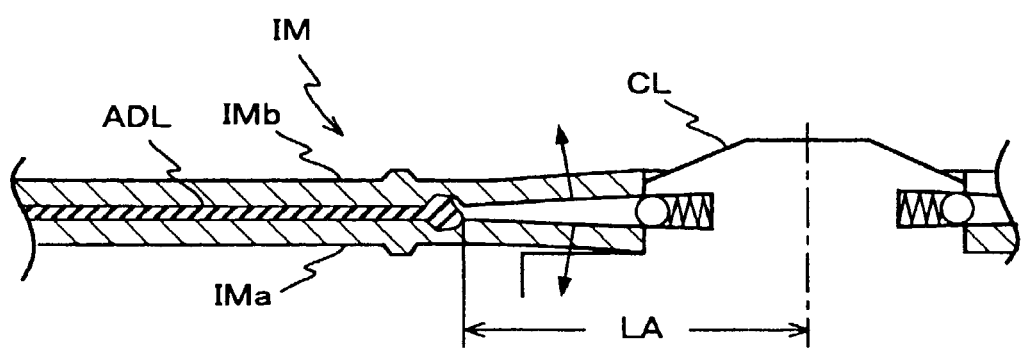
FIG. 11 is a diagram for illustrating a force applied to a bonded-type recording medium by a clamp when the bonded-type recording medium is attached to a disk unit.

Normally, when an information recording medium IM formed of recording and cover substrates Ima and Imb stuck together by an adhesive agent is attached to a drive unit, a force to separate the recording and cover substrates Ima and Imb is applied to the information recording medium IM held by a clamp CL as indicated by the arrows in FIG. 11. When the distance LA from the center of the clamp CL to the inner circumference of an adhesive agent layer ADL is larger than or equal to 10 mm, the periphery of the center hole of the information recording medium IM may be damaged. Therefore, it is desirable that the adhesive agent layer ADL be formed to spread to be as close to the inner circumference of the information recording medium IM as possible.

Normally, the process of adjusting a film thickness and removing extra liquid is started after the adhesive agent is spread (naturally) up to a given inner circumferential position by the weight of the cover substrate after sticking the recording and cover substrates together. That is, a waiting period for the natural spreading of the adhesive agent occurs in the manufacturing process. This incurs a decrease in productivity, thus presenting an obstacle to reduction in production cost. However, when the adhesive agent is applied closer to the inner circumference on the recording substrate in order to reduce the waiting period, air bubbles are more likely to enter the adhesive agent.

Figure 12A:
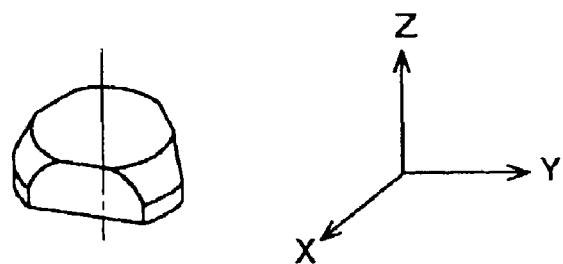
FIG. 12A is a diagram for illustrating a center boss on which cutouts for securing a gas channel are formed.
Figure 12B:
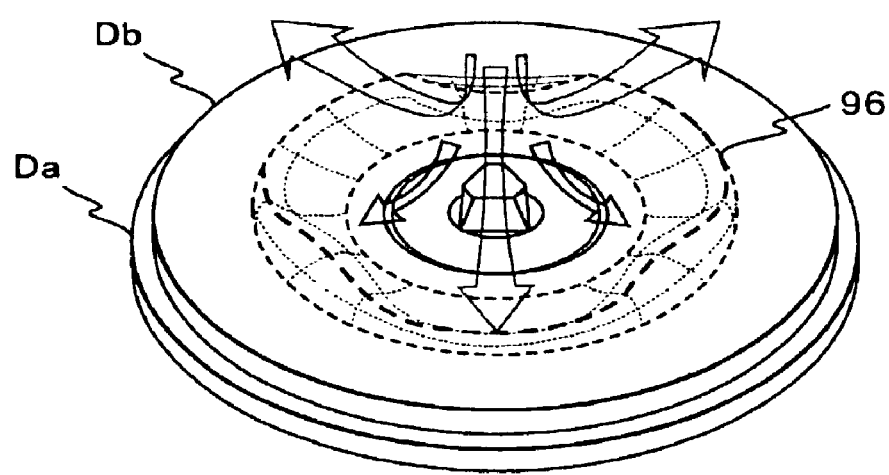
FIG. 12B is a diagram for illustrating the bias of the adhesive agent in the radial direction in the case of employing the, center boss of FIG. 12A.
Figure 13A:
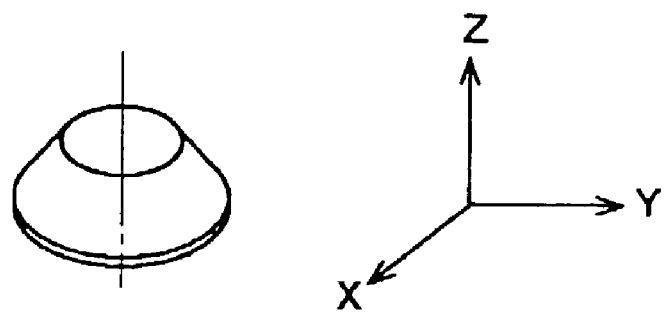
FIGS. 13A and 13B are diagrams each for illustrating a shape of the center boss which shape allows gas to be fed evenly in the radial direction.
Figure 13B:
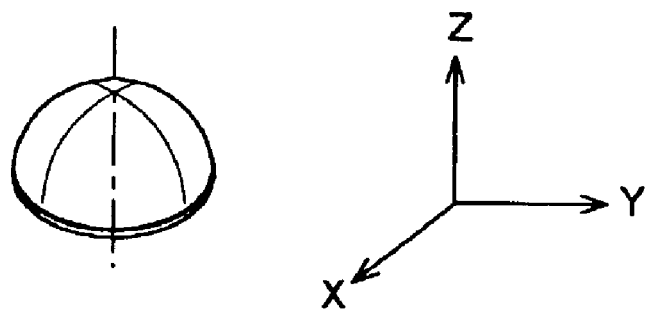

Therefore, the inventors of the present invention studied the shape of the center boss. FIG. 12A is a perspective view of a center boss that is shaped to have a diameter substantially equal to that of the center hole of each of the recording and cover substrates and include a plurality of cutouts formed on its upper end in order to guide the cover substrate onto the recording substrate and secure the channel of gas. As a result of the studies, the inventors found out that in the case of the center boss of FIG. 12A, when the adhesive agent 96 was applied closer to the inner circumference than normally on the recording substrate Da and gas was fed between the recording and cover substrates Da and Db, the gas flow was significantly affected by the shape of the center boss to have imbalanced gas volumes in the radial direction (toward the outer circumference of each of the recording and cover substrates Da and Db) as indicated by the arrows in FIG. 12B, so that the adhesive agent 96 provided between the recording and cover substrates Da and Db moved unevenly (was biased) in the radial direction. Further, the inventors found out that at the stage of superimposing the cover substrate Db on the recording substrate Da (that is, at the stage of the first touch of the recording and cover substrates Da and Db), the cover substrate Db and the adhesive agent 96 came into substantial point contact, so that no air bubbles entered the adhesive agent 96, but that in the spreading of the adhesive agent 96 in the reverse direction after contacting the cover substrate Db, air bubbles were prone to enter the adhesive agent 96 due to unevenness in the spread of the adhesive agent 96 in the radial direction toward the outer circumference. For instance, according to experiments, with the amount of applied adhesive agent being one gram and the amount of fed gas being 10 L/min, no entry of air bubbles was observed when the radii of application of the adhesive agent 96 were 22 mm and over. However, when the radii of application were set to 20 mm and less under the same conditions, the entry of air bubbles was observed. When a center boss of a truncated cone shape without any cutouts as shown in FIG. 13A and a hemispherical center boss without any cutouts as shown in FIG. 13B were employed, the sprayed gas was allowed to flow evenly in volume in the radial direction toward the outer circumference. That is, the sprayed gas is allowed to flow evenly in volume in the radial direction toward the outer circumference by employing a center boss having the shape of a rotationally symmetric body, such as the center boss shown in FIG. 13A or 13B, which is rotationally symmetrical with respect to the Z-axis that is the axis of rotation.

In the case of the center boss shaped like a truncated cone, however, the recording and cover substrates Da and Db make the first touch with each other before the cover substrate Db is positioned, so that the recording and cover substrates Da and Db are prevented from being positioned with accuracy. Further, in the case of the hemispherical center boss, air existing in space surrounded by the center boss and the adhesive agent 96 is trapped therein after the first touch of the recording and cover substrates Da and Db. Therefore, the spired state of the adhesive agent 96 collapses over time, so that the adhesive agent 96 and the cover substrate Db may come into surface contact to incur the entry of air bubbles into the adhesive agent 96.

Therefore, the shape of the center boss was determined so that the sprayed gas could flow evenly in volume in the radial direction toward the outer circumference, and a change was made to the gas channel between the above-described first and second states in the sticking process.

Figure 14A:
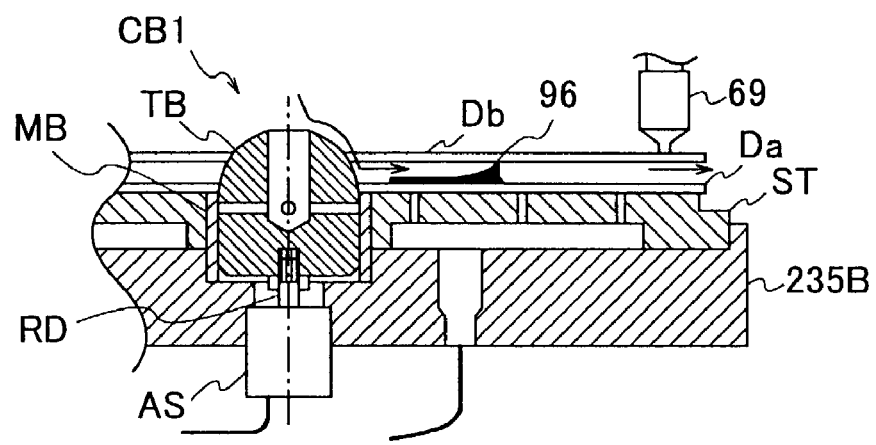
FIGS. 14A and 14B are diagrams each for illustrating the operation of sticking the recording and cover substrates in the case of employing a center boss including an actuator and a positioning member driven vertically by the actuator.

A brief description will be given of the case of employing a center boss CB1 including a positioning member TB, an elevation rod RD, and a pneumatic cylinder AS as shown in FIG. 14A.

The positioning member TB has a hemispherical top part and includes a plurality of through holes formed thereinside from the top part to the side surface. These through holes are used as a gas channel in the second state. It is more desirable that the through holes (hereinafter also referred to as "channel holes") be provided evenly in the circumferential direction. Further, the positioning member TB is coupled to the pneumatic cylinder AS via the elevation rod RD. When the elevation rod RD is driven by the pneumatic cylinder AS to move vertically (upward and downward), the positioning member TB also moves upward and downward accordingly. Further, a metal bush MB is embedded between the positioning member TB and the placement table 235B so as to guide the vertical movement of the positioning member more smoothly and accurately. The recording substrate Da is held on the placement table 235B by vacuum suction through a suction stage ST. FIG. 14A shows the first state in the sticking process (sticking operation).

In the first state, as shown in FIG. 14A, only the hemispherical top part of the positioning member TB appears from the surface of the suction stage ST. In this case, gas is supplied to the internal space between the recording and cover substrates Da and Db with the gap formed between the cover substrate Db and the positioning member TB serving as part of the gas channel, and the adhesive agent 96 gathers to form a mound as previously described. In the first state, each of the channel holes has one end thereof closed by the metal bush MB. Further, the adhesive agent 96 is applied closer to the inner circumference than conventionally on the recording substrate Da.

Figure 14B:
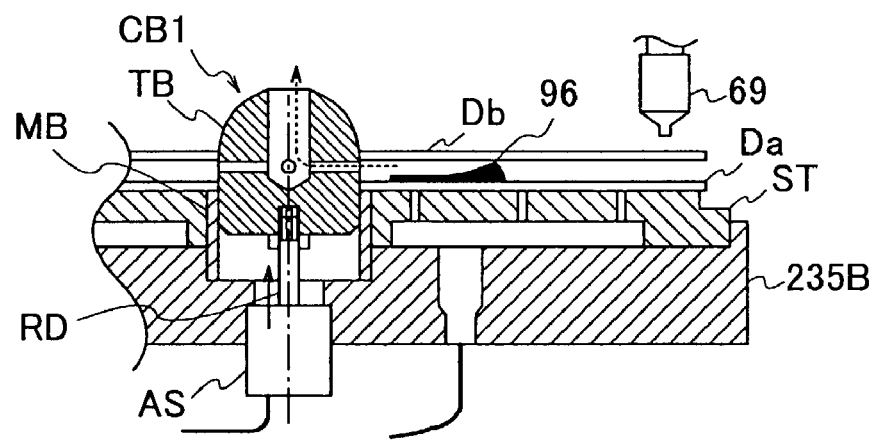

When the cover substrate Db held by the suction pads 69 is moved further downward to reach the release point, the cover substrate Db is released from the arm and the arm starts to ascend. At this point, with the ascent of the arm, the pneumatic cylinder AS is driven so as to elevate the positioning member TB to the position where the channel holes of the positioning member TB communicate with space surrounded by the recording and cover substrates Da and Db (hereinafter, this space is referred to as an "inner area") as shown in FIG. 14B. Thereby, air (gas) inside the inner area is gradually discharged outside through the channel holes of the positioning member TB as indicated by the broken arrow in FIG. 14B. FIG. 14B shows the second state in the sticking process (sticking operation). At this point, the cover substrate Db is moved downward, guided by the side surface of the positioning member TB. Therefore, the cover substrate Db can be superimposed on the recording substrate Da with good accuracy.

Accordingly, the recording and cover substrates Da and Db can be positioned with respect to each other with accuracy, and at the same time, the waiting period for the natural spreading of the adhesive agent 96 can be made shorter than conventionally. That is, the center boss CB1 functions as a channel changing part as well as a positioning part.

Figure 15A:
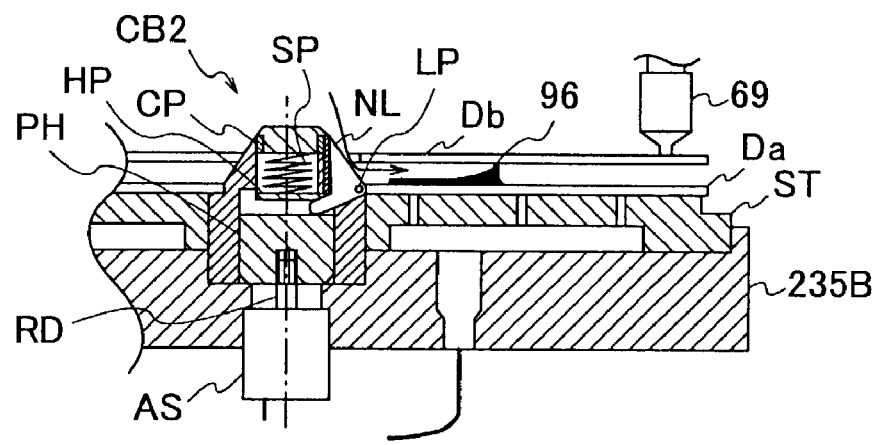
FIGS. 15A and 15B are diagrams each for illustrating the operation of sticking the recording and cover substrates in the case of employing a center boss including an actuator and a positioning member that works with the actuator to switch from a positioning cancel state to a positioning state.

A description will further be given of the case of employing a center boss CB2 including a cap CP, a spring SP, a hold plate HP, a plurality of positioning claws NL, a piston head PH, the elevation rod RD, and the pneumatic cylinder AS as shown in FIG. 15A. FIG. 15A shows the first state in the sticking operation.

The cap CP has a truncated cone-like top part, and houses in its internal space the spring SP and the hold plate HP for maintaining the positioning claws NL in a positioning cancel state. The piston head HP is coupled to the pneumatic cylinder AS via the elevation rod RD. When the pneumatic cylinder AS is driven to elevate the piston head HP from a first given position to a second given position, the piston head HP switches the positions of the positioning claws NL from the positioning cancel state to a positioning state.

Each of the positioning claws NL is coupled to the cap CP through a link pin LP so as to be turnable (swingable) about the link pin LP. That is, each of the positioning claws NL works with the vertical movement of the piston head PH to swing vertically about the link pin LP that is the central axis.

In the first state, the piston head PH is located at the first given position and the positions of the positioning claws NL are in the positioning cancel state as shown in FIG. 15A. In this case, gas is supplied into the internal space between the recording and cover substrates Da and Db with the gap formed between the cover substrate Db and the positioning claws NL serving as part of the gas channel, and the adhesive agent 96 gathers to form a mound as previously described. The adhesive agent 96 is applied closer to the inner circumference than conventionally on the recording substrate Da.

Figure 15B:
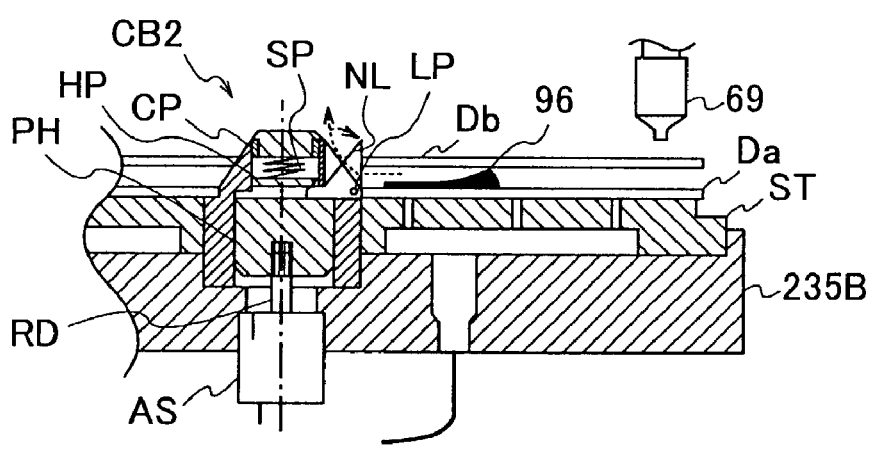

When the cover substrate Db held by the suction pads 69 is moved further downward to reach the release point, the cover substrate Db is released from the arm and the arm starts to ascend. At this point, with the ascent of the arm, the pneumatic cylinder AS is driven so as to elevate the piston head PH to the second given position as shown in FIG. 15B. Thereby, the positions of the positioning claws NL are switched to the positioning state. Further, air (gas) inside the inner area is gradually discharged outside through the gap formed between the cover substrate Db and the cap CP serving as part of the gas channel as indicated by the broken arrow in FIG. 15B. FIG. 15B shows the second state in the sticking operation. At this point, the cover substrate Db is moved downward, guided by the positioning claws NL. Therefore, the cover substrate Db can be superimposed on the recording substrate Da with good accuracy.

Accordingly, the recording and cover substrates Da and Db can be positioned with respect to each other with accuracy, and at the same time, the waiting period for the natural spreading of the adhesive agent 96 can be made shorter than conventionally. That is, the center boss CB2 functions as a channel changing part as well as a positioning part.

The present invention is not limited to the specifically disclosed embodiment, but variations and modifications may be made without departing from the scope of the present invention.

The present application is based on Japanese priority applications No. 2001-264726 filed on Aug. 31, 2001, No. 2002-174521 filed on Jun. 14, 2002, and No. 2002-196766 filed on Jul. 5, 2002, the entire contents of which are hereby incorporated by reference.

What is claimed is:

1. An apparatus for manufacturing a plate-like body formed of first and second members stuck together by a liquid, the apparatus comprising:
    a placement table having a substantially horizontal surface on which the first member is placed with a surface thereof facing upward and having the liquid applied thereon in advance;
    a holding unit configured to hold and release the second member above said placement table;
    a positioning part configured to fit into center holes of the first and second members;
    a state changing part moving the second member held by said holding unit above and opposite the first member placed on said placement table so that the second member is superimposed on the first member through the liquid when the holding unit releases the second member; and
    a gas feeding part feeding gas between the first and second members, wherein said state changing part changes a state of the second member from a first state to a second state and said positioning part comprises a channel changing part that changes at least part of a gas channel between the first and second states,
    wherein the holding unit and the gas feeding part are attached to the state changing part.

2. The apparatus as claimed in claim 1, further comprising a control part controlling at least one of pressure, flow, and temperature of the gas.

3. The apparatus as claimed in claim 1, further comprising an ionization part that ionizes the gas.

4. The apparatus as claimed in claim 1, further comprising a charge removal part electrically neutralizing the first and second members.

5. The apparatus as claimed in claim 1, wherein the liquid is an adhesive agent.

6. The apparatus as claimed in claim 1, wherein the first and second members are first and second substrates, respectively; and the plate-like body formed of the stuck first and second members is a recording medium.

7. The apparatus as claimed in claim 1, wherein the plate-like body formed of the stuck first and second members is an optical information recording medium.

8. The apparatus as claimed in claim 1, wherein said state changing part changes the state of the second member from the first state where the second member is held by said holding unit above and opposite the first member placed on said placement table to the second state where the second member is superimposed on the first member through the liquid by relatively driving said placement table and said holding unit so that said placement table and said holding unit approach each other and releasing the second member from said holding unit when the first and second members are at a given distance from each other, and said gas feeding part feeds the gas at least during a part of a transition period from the first state to the second state, the part including an instant of initial contact of the liquid with the second member.

9. The apparatus as claimed in claim 8, wherein said gas feeding part feeds the gas constantly during the transition period.

10. The apparatus as claimed in claim 1, wherein said gas feeding part is movable between a given wait position and a position at which to feed the gas.

11. The apparatus as claimed in claim 10, further comprising a rate control part controlling a rate at which said gas feeding part is moved.

12. The apparatus as claimed in claim 1, wherein each of the first and second members is a circular member having a center hole formed therein;
the liquid is applied annularly on the one of the surfaces of the first member; and
said gas feeding part feeds the gas through the center hole of the second member into a space formed between the first and second members inside the annular liquid applied on the one of the surfaces of the first member.

13. The apparatus as claimed in claim 12, wherein said holding unit holds the second member by a part close to an outer circumference thereof and further comprises a pressing part that presses a periphery of the center hole of the second member held by said holding unit toward said placement table before the second member contacts the liquid.

14. The apparatus as claimed in claim 12, wherein the positioning part is configured to position the first and second members relative to each other to form the gas channel.

15. The apparatus as claimed in claim 14, wherein said positioning part comprises a positioning member having such a surface shape as to form the gas channel so that the gas is fed substantially evenly in a radial direction of the first and second members.

16. The apparatus as claimed in claim 14, wherein said positioning part comprises a positioning member provided on the surface of said placement table.

17. The apparatus as claimed in claim 14, wherein:
said positioning part comprises:
an actuator; and
a movable member driven by said actuator; and
said actuator drives said movable member so that at least part of the gas channel is changed between the first and second states.

18. The apparatus as claimed in claim 17, wherein said movable member is a positioning member that is driven vertically by said actuator.

19. The apparatus as claimed in claim 18, wherein said movable member comprises through holes forming part of the gas channel in the second state.

20. The apparatus as claimed in claim 18, wherein said positioning part further comprises a positioning member that works with said movable member to switch from a positioning cancel state to a positioning state when said movable member is driven by said actuator to move from a first position to a second position.

21. An apparatus for manufacturing a plate-like body, comprising:
a placement table having a substantially horizontal surface on which a first member is placed with a surface thereof facing upward and having a liquid applied thereon in advance;
a holding unit configured to hold and release a second member above the placement table;
a state changing part moving the second member held by the holding unit above and opposite the first member placed on the placement table so that the second member is superimposed on the first member when the holding unit releases the second member; and
gas feeding means for feeding gas between the first and second members,
wherein the holding unit and the gas feeding means are attached to the state changing part.

* * * * *